US012638604B2

(12) United States Patent　　　　(10) Patent No.:　US 12,638,604 B2

Montemont　　　　　　　　　　　　(45) Date of Patent:　May 26, 2026

(54) METHOD FOR FORMING A GAMMA IMAGE BY COMBINING A COMPTON IMAGING MODALITY AND A CODED MASK IMAGING MODALITY

(71) Applicant: COMMISSARIAT A L'ENERGIE ATOMIQUE ET AUX ENERGIES ALTERNATIVES, Paris (FR)

(72) Inventor: Guillaume Montemont, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 180 days.

(21) Appl. No.: 18/725,247

(22) PCT Filed: Dec. 28, 2022

(86) PCT No.: PCT/EP2022/087975

§ 371 (c)(1),
(2) Date: Jun. 28, 2024

(87) PCT Pub. No.: WO2023/126454

PCT Pub. Date: Jul. 6, 2023

(65) Prior Publication Data

US 2025/0155588 A1　　May 15, 2025

(30) Foreign Application Priority Data

Dec. 29, 2021　(FR) ...................................... 2114653

(51) Int. Cl.
*G01T 1/29*　　　　(2006.01)

(52) U.S. Cl.
CPC ..................................... *G01T 1/295* (2013.01)

(58) Field of Classification Search
None
See application file for complete search history.

(56) References Cited

U.S. PATENT DOCUMENTS

| | | | | |
|---|---|---|---|---|
| 11,707,243 B2 * | 7/2023 | Cai | ........................ | A61B 6/037 |
| | | | | 250/370.09 |
| 12,153,170 B2 * | 11/2024 | Tuya | ..................... | G01T 1/2921 |
| 12,433,548 B2 * | 10/2025 | Tashima | ................. | A61B 6/037 |
| 2010/0038550 A1 * | 2/2010 | DeVito | .................. | G01V 5/234 |
| | | | | 250/370.11 |
| 2014/0301535 A1 | 10/2014 | Williams et al. | | |
| 2021/0165112 A1 | 6/2021 | Montemont | | |

(Continued)

OTHER PUBLICATIONS

International Search Report and Written Opinion issued on Mar. 31, 2023 in PCT/EP2022/087975 filed on Dec. 28, 2022 (with English translation of International Search Report), 22 pages.

(Continued)

*Primary Examiner* — Marcus H Taningco

(74) *Attorney, Agent, or Firm* — Oblon, McClelland, Maier & Neustadt, L.L.P.

(57)　　　　ABSTRACT

A method of reconstructing the position of a source using a gamma camera. The gamma camera combines two imaging modalities: a coded mask imaging modality and a Compton imaging modality. The method comprises the selection of at least one isotope, the reconstruction being carried out according to a Bayesian probabilistic approach, taking into account each selected isotope.

10 Claims, 11 Drawing Sheets

(56) References Cited

U.S. PATENT DOCUMENTS

2021/0239862 A1* 8/2021 Petrak ..................... G01T 1/167

OTHER PUBLICATIONS

Montémont et al., "NuVISION: a Portable Multimode Gamma Camera based on HiSPECT Imaging Module", 2017 IEEE Nuclear Science Symposium and Medical Imaging Conference (NSS/MIC), IEEE, Oct. 21, 2017, XP033445981, 3 pages.
Hu et al., "Design and performance evaluation of a 4T-view gamma camera with mosaic-patterned 3D position-sensitive scintillators", Nuclear Inst. and Methods in Physics Research, Section A, vol. 1023, 2022, XP086892207, pp. 1-14.

* cited by examiner

METHOD FOR FORMING A GAMMA IMAGE BY COMBINING A COMPTON IMAGING MODALITY AND A CODED MASK IMAGING MODALITY

TECHNICAL FIELD

The technical field of the invention is that of X-ray or gamma imaging, and more particularly the reconstruction of the position of irradiation sources using an image acquired by a gamma camera.

PRIOR ART

Gamma cameras are devices for forming an image to create a map of irradiation sources in a given environment. A first application is the display of an irradiation source in an organism for the purposes of medical diagnostics. Another application is the location of an irradiating source in an installation, particularly in a nuclear installation.

The use of gamma cameras in the medical field is relatively long-established. In the nuclear industry, this type of device was developed in the 1990s, and has been increasingly used in nuclear installations, for the purposes of radiological characterization. The aim is to identify the main irradiating sources present in an installation. In fact, irradiation sources are not uniformly distributed. They are often locally concentrated in the form of "hot spots", a commonly used term in the field of radiation safety. A gamma camera has the advantage of providing remote location of these hot spots.

Some gamma cameras consist of a two-dimensional array of pixels connected to a detector material. The detector material is usually a semiconductor material such as CdTe or CdZnTe. As a result of an interaction of an ionizing radiation in the detector material, one or more pixels generate an electrical pulse, the amplitude of which is correlated with the energy released by the radiation in the interaction. Each pixel is connected to an electronic circuit for processing the pulses.

Each pixel is formed by an electrode, usually acting as an anode. When an incident radiation interacts in the detector material, electrons are released in the detector material. The electrons are collected by an anode. The anode generates a pulse whose amplitude depends on the number of electrons collected by the anode, this number usually being proportional to an energy lost by the ionizing radiation in the detector material. Thus the energy lost by the radiation in the interaction can be estimated from the amplitude of a pulse.

It is also possible to locate the position of an interaction with respect to the depth of the detector material, that is to say perpendicularly to the anode array. The estimation of the depth of the interaction is described, for example, in Montemont et al., "Studying spatial resolution of CZT detectors using sub-pixel positioning for SPECT", IEEE Transactions on Nuclear Science, Vol. 61, No. 5 Oct. 2014.

Some gamma cameras use a code mask collimator formed by a predetermined pattern. The pattern may, for example, be periodic and may comprise an elementary lattice reproduced by rotation and/or translation. The pattern allows alternation between the absorbent parts, between which there extend openings. The whole assembly forms a coded mask. The collimator enables an observed field to be delimited. On the basis of an image formed on the gamma camera, a back projection operator can be used to find a position of the irradiating source in the field of observation. With this type of gamma camera, only the interactions due to radiation emitted by the source, and not those scattered before the interaction in the detector material, contribute to the useful information for locating the irradiating sources in the observation field.

Another type of gamma camera makes use of the temporally coincident interactions resulting from the Compton scattering (inelastic scattering) of X or gamma radiation Usually, the first interaction corresponds to Compton scattering, while the second interaction is photoelectric absorption. Knowledge of the coordinates of two interactions resulting from the scattering of an ionizing photon in the detector material, and of the energies released by each interaction respectively, may be used to estimate a path of the incident photon. An advantage of Compton gamma cameras is the absence of collimation, resulting in a field of observation of $4\pi$ steradians. Another advantage is the possibility of providing a compact device. The document US2014/301535 describes an example of a Compton gamma camera.

The paper by G. Montemont, "NuVision: a portable multimode gamma camera based on HiSPECT imaging module", describes a multimode gamma camera that couples a coded mask imaging modality with a Compton imaging modality. This paper describes two independent reconstructions, one based on photons detected by the coded mask imaging modality, and the other based on photons detected by Compton imaging. Each reconstruction may be used to position irradiating sources in space.

The invention described below provides a combination of the coded mask imaging modality and the Compton imaging modality, the reconstruction algorithm combining the interactions detected by the coded mask imaging modality and by the Compton imaging modality.

SUMMARY OF THE INVENTION

A first object of the invention is a method of estimating positions of irradiating sources in a field of observation, using a gamma camera, the gamma camera comprising:

a detection material;

pixels distributed over a detection surface of the detection material, each pixel being configured to form a detection signal as a result of the detection of an interaction of an ionizing photon in the detection material;

a collimator, positioned to face the detection material, and defining a first field of observation, included in the field of observation of the gamma camera;

a location unit, configured to assign a position to each interaction in the detection material on the basis of the detection signal generated by said interaction;

a spectrometry unit, configured to assign an energy to each interaction detected, on the basis of the detection signal generated by said interaction;

a coincidence unit, configured to identify each interaction as a single or multiple interaction, a multiple interaction being formed from two scattering interactions detected in temporal coincidence;

a memory, configured to store detected interaction parameters;

the method comprising the following steps:

a) acquiring detection signals by the pixels within an acquisition period, each detection signal being associated with a detected interaction;

b) on the basis of the detection signals, assigning a position and an energy to each interaction detected;

c) identifying each detected interaction as a single or multiple interaction;

d) using the memory to store the parameters of each interaction, the parameters of each interaction comprising the position and energy of said interaction;

the method being characterized in that it also comprises:

e) selecting an isotope from a list of isotopes;

f) according to the energy assigned to each interaction, whether single or multiple, calculating a probability of emission by the isotope;

g) on the basis of the parameters of each interaction, calculating a probability of emission of the photon that has generated the interaction, from different points in the field of observation;

h) taking into account an a priori probability of emission of a photon for the selected isotope, from the different points of the field of observation;

i) according to the probabilities resulting from g) and h), calculating a spatial distribution of emission intensity in the first field of observation for the isotope selected in step e).

Steps h) and i) can be executed iteratively, so that, on each iteration:

step h) comprises taking into account a spatial distribution of the emission intensity of the isotope, whether initial or resulting from a preceding iteration; step i) comprises updating the spatial distribution of the emission intensity for the selected isotope, according to:

the a priori probability of emission resulting from step h) of the same iteration;

the probabilities resulting from steps f) and g).

According to one embodiment: in step e), the isotope is selected according to the energies respectively assigned to different interactions detected;

or selected arbitrarily.

According to one embodiment, steps f) to i) are executed successively for different isotopes selected.

According to one embodiment, step f) is implemented by calculating:

a probability that the photon that has generated the interaction is a direct photon that was emitted by the isotope according to an emission energy of the isotope, and that has reached the detection material while conserving the emission energy, without passing through an absorbent part of the collimator;

a probability that the photon that has generated the interaction is an indirect photon that was emitted by the isotope according to an emission energy of the isotope, and that has reached the detection material with an energy less than the emission energy and/or by passing through an absorbent part of the collimator;

According to one embodiment, step f) comprises taking into account, for each emission energy of the isotope:

a distribution of probabilities of detection of an interaction in the detector material at different energies, on the assumption that the photon that has generated the interaction is a direct photon;

a distribution of probabilities of detection of an interaction in the detector material at different energies, on the assumption that the photon that generated the interaction is an indirect photon;

the distributions of probabilities of detection having been calculated in advance for the cases of a single interaction and a multiple interaction.

According to one embodiment, step g) comprises:

if the interaction is single, selecting a first spatial response model of the camera, the probability of the emission position from different points of the first field of observation being determined according to the first spatial response model and according to the position of the interaction in the detector material;

if the interaction is multiple, selecting a second spatial response model of the camera, the probability of the emission position from different points of the field of observation being determined according to the second spatial response and energy model and according to the position of the interactions detected in temporal coincidence and forming the multiple interaction in the detector material.

The first spatial response model can determine, for different two-dimensional positions of single interactions established parallel to the detection surface, a probability of detection of a photon emitted from different points of the first field of observation, each single interaction being an interaction not considered to be multiple.

The second spatial response model determines, for different three-dimensional positions of interactions detected in temporal coincidence, forming the multiple interaction, and for different energy values of said interactions, a probability of detection of a photon emitted from different points of the field of observation.

A second object of the invention is a gamma camera, designed to detect a presence of irradiating sources in a field of observation, the gamma camera comprising:

a detection material;

a coded mask collimator, extending facing the detection material;

pixels distributed over a detection surface of the semiconductor material, each pixel being configured to form a detection signal as a result of the detection of an interaction of an ionizing photon in the semiconductor material;

a location unit, configured to assign a position to each interaction in the semiconductor material on the basis of a detection signal generated by said interaction, so as to obtain a location on the detection surface and along a direction perpendicular to the detection surface;

a spectrometry unit, configured to assign an energy to each interaction detected, on the basis of the detection signal generated by said interaction;

a coincidence unit, such that it can identify each interaction as a single or multiple interaction, a multiple interaction being formed from two interactions detected in temporal coincidence;

a memory, configured to store a number of detected interactions;

a processing unit configured to process the interactions stored in the memory, the processing unit being configured to implement steps d) to i) of a method according to the first object of the invention.

The invention will be more readily understood from a perusal of the details of examples of embodiment provided in the remainder of the description, in relation to the figures listed below.

FIGURES

DISCLOSURE OF PARTICULAR EMBODIMENTS

Figures 1A, 1B:
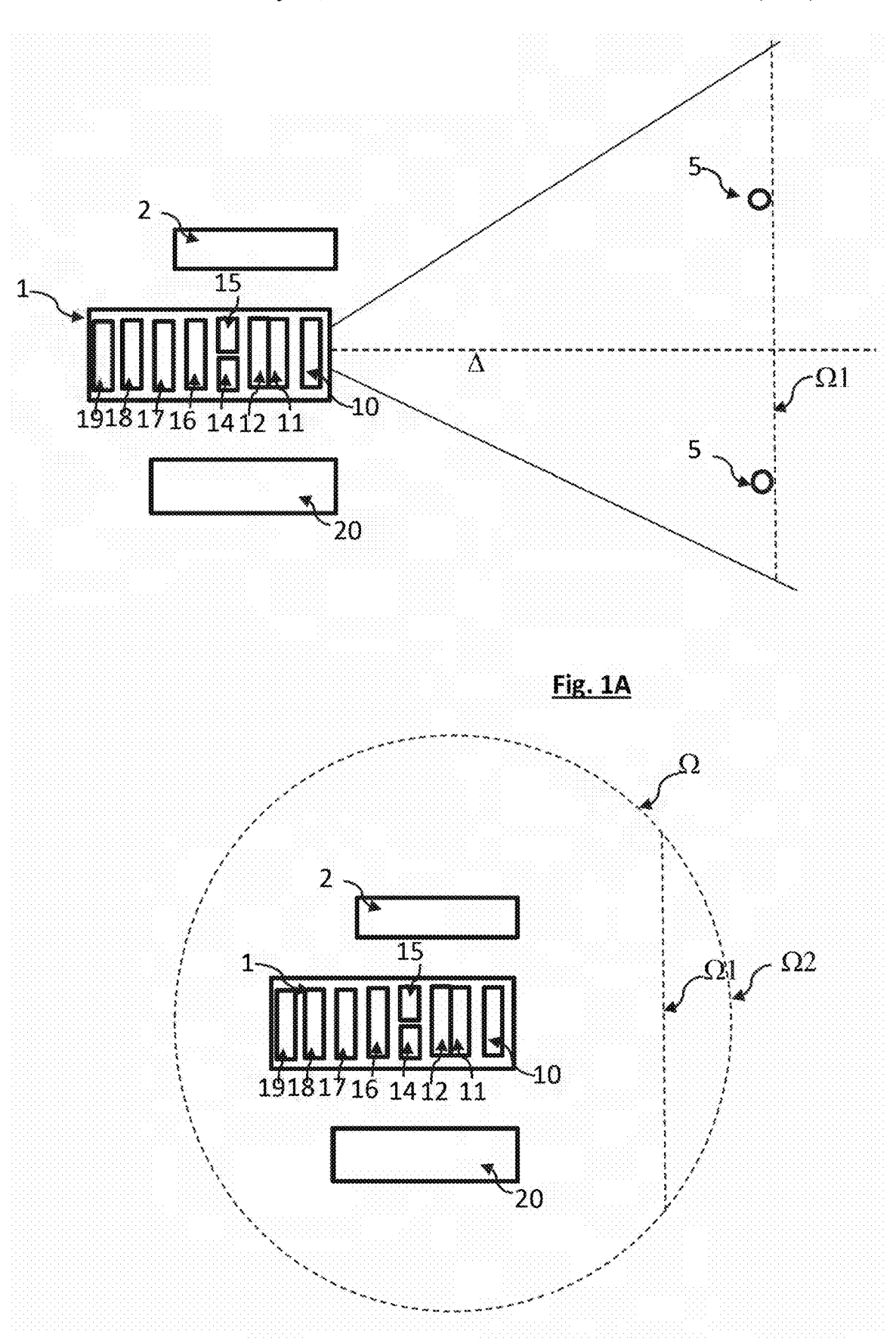
FIGS. 1A and 1B show schematically the main components of a gamma camera that can be used to implement the invention.

FIGS. 1A and 1B shows a gamma camera 1 that can be used to implement the invention. The gamma camera is configured to detect ionizing photons of the X or gamma type, the energy of which is usually between 10 keV and 10 MeV. The purpose of the gamma camera is to locate irradiating sources present in the field of observation Ω. The field of observation Ω extends around a central axis Δ. The gamma camera can be coupled to a visible camera 2 for forming a visible image of the field of observation. The term "gamma camera" refers to an imaging device having a field of observation, configured for forming an object image O for locating irradiation sources in the field of observation.

The gamma camera comprises a detector material 11, usually a semiconductor material allowing charge carriers (electron/hole pairs) to be created in an interaction with X or gamma radiation. The material may, notably, be CdTe or CdZnTe.

The gamma camera comprises pixels 12, distributed on a detection surface. In the example shown, the pixels 12 are coplanar and distributed in a two-dimensional array, preferably regular. Other options are possible and are described below. The array may, for example, comprises several tens or even several hundreds of pixels. Each pixel 12 is an elementary radiation detector. In the example described, each pixel 12 is an anode, the polarization of which enables it to collect electrons produced in an interaction occurring in the detector material.

When an ionizing photon interacts in the detector material 11, charge carriers, such as electrons, migrate toward one or more pixels, these pixels being hit pixels: each hit pixel is a pixel that collects charge carriers. An interaction can create one or more hit pixels. If the pixels are small, a plurality of pixels may be hit in one interaction. If the pixels are large, the number of hit pixels is reduced and may be limited to a single hit pixel. When they migrate toward a hit pixel, the charge carriers may generate a signal, usually called an induced signal, on the pixels adjacent to the hit pixel(s).

As a general rule, each interaction causes the formation of a signal of detection by at least one pixel, more often a plurality of pixels. The detection signal can be a signal resulting from the collection of charge carriers by one or more pixels 12 or a signal caused by the migration of charge carriers through the detector material 11.

The gamma camera comprises a location unit 14, such that it defines a three-dimensional position of each interaction in the detector material 11.

If the pixels have a large surface area, typically more than 1 mm², the location unit can implement sub-pixeling in order to assign a two-dimensional position (x,y) of each interaction detected, parallel to the detection surface 12, on the basis of detection signals formed by a plurality of pixels 12 following each interaction. Thus each pixel is virtually divided into virtual pixels. The division into virtual pixels improves the spatial resolution. Such a method is described, for example, in the papers by W. K. Warburton, "An approach to sub-pixel spatial resolution in room temperature X-ray detector arrays with good energy resolution" and by Montemont et al., "Studying spatial resolution of CZT detectors using sub-pixel positioning for SPECT", IEEE Transactions on Nuclear Science, Vol. 61, No. 5, October 2014, and also in the U.S. Pat. No. 9,322,937B2. Using these methods, the size of the virtual pixels may be, for example, 0.5 mm*0.5 mm, or 0.1 mm by 0.1 mm. The use of sub-pixeling is only justified when the surface area of the pixels 12 is considered to be too great. The term "pixel" is used below to denote either a virtual pixel or a physical pixel.

The location unit 14 may be configured to establish an interaction depth along an axis perpendicular to the detection surface of the detection material 11. The interaction depth may, for example, be determined on the basis of the detection signal(s) generated by the pixel(s) that have collected the charge carriers. The interaction depth is determined when the detection material is sufficiently thick, for example with a thickness of more than 1 mm. If the material is considered to be thin, the interaction depth is fixed throughout the material. The detector may be composed of different thin detection layers that are spaced apart from one another, preferably parallel to one another. In this case, each layer is assigned an interaction coordinate perpendicularly to the detection surface.

As a result of the collection of charge carriers, each pixel 12 generates a pulse whose amplitude depends on the energy released in the detector material by an ionizing photon, in the course of an interaction, this energy usually being called the "interaction energy". The gamma camera 1 comprises a spectrometry unit 15. The spectrometry unit enables the most accurate possible estimate to be made of the amplitude of the pulses resulting from the collection of charge carriers following an interaction. The spectrometry unit may comprise electronic means (pulse shaping circuit, multi-channel analyzer, analog-digital converter) as well as software means. The estimation of the amplitude of a pulse enables the energy of the interaction to be estimated. This energy must be estimated as precisely as possible. The energy range considered is usually between 10 keV and several hundreds of keV, or even several MeV. It is desirable for the accuracy of the energy to be of the order of one percent or even less.

Thus the spectrometry unit 15 may be used to obtain an energy spectrum of the interactions detected by each pixel. Each interaction is thus classified in an energy channel c. Each energy channel c extends between $E\pm\delta E$. $2\delta E$ is then the spectral width of each energy channel. For example, $2\delta E = 0.2$ keV. The isotopes responsible for the irradiation can be identified according to the energy of the photons detected. The energy of each interaction can also be the subject of a process using a spectral response of the gamma camera, as described below.

The gamma camera is bimodal. It is configured to make use of the interactions detected in the detector material 11 for the purpose of reconstructing a position of irradiating sources in the field of observation, by using a reconstruction modality that depends on each interaction detected. The gamma camera comprises a collimator 10 of the coded mask type, as described in the prior art.

According to a first modality, the interactions detected are due to photons that have propagated through the collimator 10 before reaching the detection material. This first modality enables the irradiating sources potentially present in a first field of observation $\Omega1$ to be detected. Each point in the first field of observation can be projected all the way through the mask onto the detector. This means that radiation emitted by each point in the first field, projected all the way through the coded mask 10, reaches the detection material. The interactions used by the first modality are what are known as single interactions, in the sense that they do not occur in temporal coincidence: they are detected at different instants. The first field of observation $\Omega1$ is shown in FIG. 1B.

According to a second modality, called the Compton imaging modality, the detected interactions are the result of photons emitted around the gamma camera, interacting in the detector material 11 by Compton scattering. In a known manner, following a Compton scattering, a scattered photon is propagated at a scattering angle relative to the path incident on the detector material. When the scattered photon is absorbed into the detector material, the incident path can be estimated. The occurrence of inelastic scattering (or Compton scattering), followed by absorption of the scattered photon, causes two interactions which are detected simultaneously, that is to say in temporal coincidence. When the position and energy of each interaction are known, the incident path of the photon can be estimated according to the expression:

$$\cos \alpha = 1 - m_e c^2 \left[ \frac{1}{E_2} - \frac{1}{E_1 - E_2} \right] \tag{1}$$

where:

$\alpha$ is an angle between the path of the photon incident on the detector material 11 and a straight line connecting the positions of the two interactions in the detector material. This is the scattering angle.

$E_1$ and $E_2$ are the respective energies of the first and second interactions, in chronological order.

$m_e$ is the mass of an electron;

c is the speed of light in a vacuum.

Figures 2A, 2B:
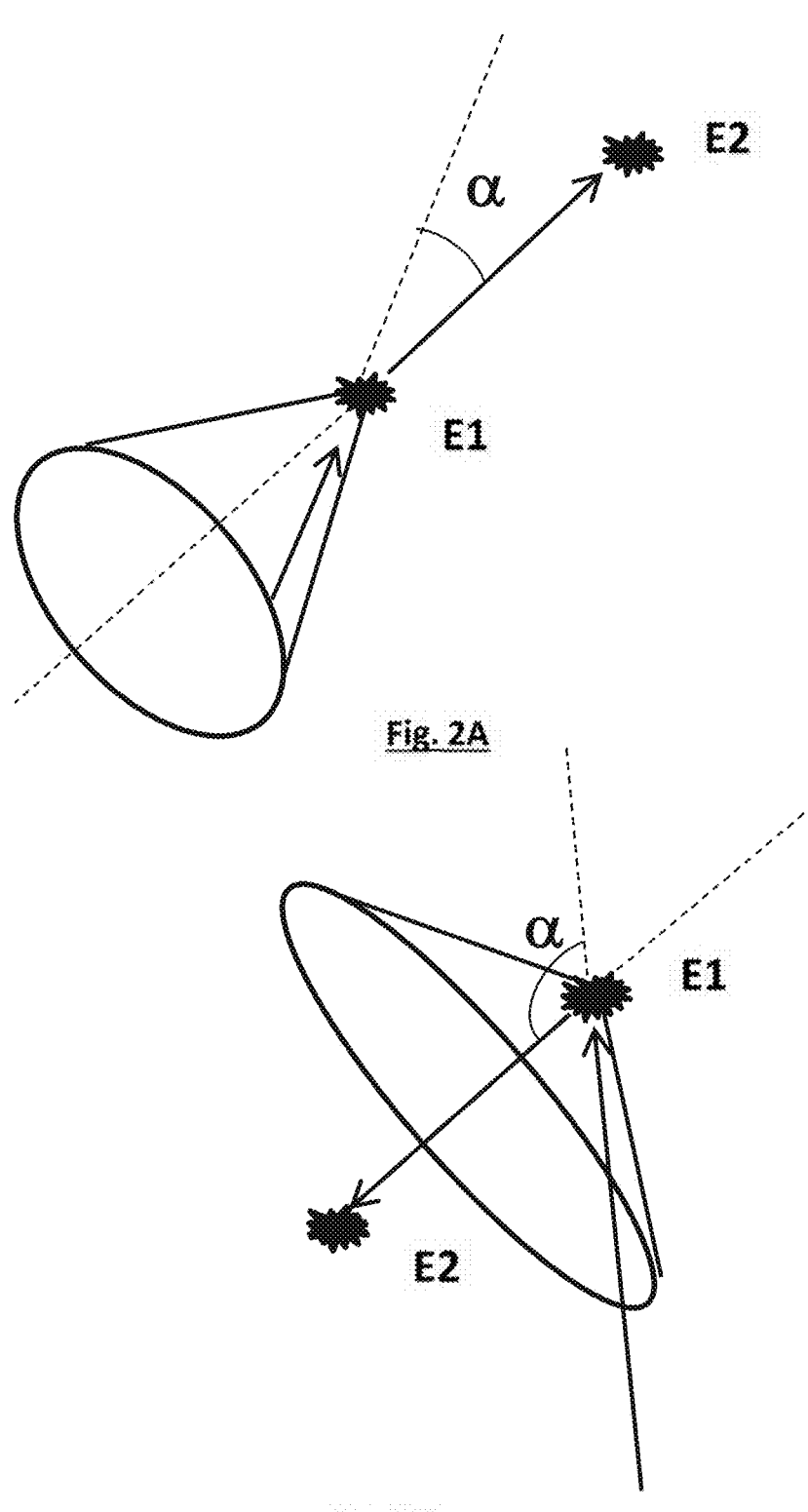
FIGS. 2A and 2B show two scattering configurations according to which two interactions are alternatively considered as a scattering and an absorption.

FIGS. 2A and 2B show the angle $\alpha$ between the incident path of a photon and a straight line separating two interactions generated as a result of the inelastic scattering of the photon in the detector material. A first interaction, releasing an energy $E_1$, corresponds to scattering at a scattering angle $\alpha$. The energy $E_1$ corresponds to part of the energy of the incident photon. A second interaction, releasing an energy $E_2$, corresponds to an absorption of the scattered radiation. The energy $E_2$ corresponds to the energy of the scattered photon. The two interactions are separated in time, but the time interval between them is too short to be determined. Thus both interactions are considered to be simultaneous, or in temporal coincidence, and form a multiple interaction with a total energy $E=E_1+E_2$. It is impossible to determine which of the two interactions precedes the other. Consequently, when two interactions are detected simultaneously, it is considered that each interaction is a first interaction (scattering) followed by a second (absorption of the scattered photon). This results in two different estimates of surfaces comprising the path of the incident photon. FIG. 2A shows "forward" scattering, where the scattering angle $\alpha$ is acute, while FIG. 2B shows backscattering ("backward" scattering), where the scattering angle $\alpha$ is obtuse. The terms "forward" and "backward" are to be understood in relation to the path of the photon incident on the detector. The probability of each configuration (forward scattering or backscattering) is governed by the Klein-Nishina relation:

$$p(E, E_2) \propto e \times (e^2 + \cos^2(\alpha)) \tag{1'}$$

where $$e = \frac{E_2}{E}$$

and $\alpha$ is deduced from expression (1).

FIGS. 2A and 2B show two conical surfaces, each conical surface corresponding to the potential paths of the incident photon in each example. Thus, one or two conical surfaces, weighted by a probability resulting from the Klein-Nishina relation, are assigned to each multiple interaction. After a sufficient number of multiple interactions have been detected, the position of each irradiating source is determined by an intersection of the different conical surfaces assigned to each multiple interaction.

The second modality of Compton imaging makes it possible to detect and locate sources situated in a second field of observation that may extend at a solid angle of $4\pi$ steradians around the detection material.

Thus the first imaging modality using the coded mask collimator uses a first, relatively small, field of observation, while the second modality uses a second field of observation $\Omega2$ that extends beyond the first field of observation $\Omega1$ and well beyond the latter. In the following description, the first field of observation $\Omega1$ is a flat surface located at a predetermined distance from the gamma camera. The second field of observation $\Omega2$ is a sphere of predetermined radius around the gamma camera, centered on the detector 11.

The field of observation of the gamma camera $\Omega$ is:

either the second field of observation $\Omega2$, or the second field of observation $\Omega 2$ truncated by a flat part corresponding to the first field of observation $\Omega 1$, to which the first field of observation $\Omega 1$ is added. The field of observation of the gamma camera $\Omega$ comprises a spherical part (part of the field of observation $\Omega 2$ without any intersection with the field of observation $\Omega 1$) and a flat part, the latter corresponding to the first field of observation $\Omega 1$. See FIG. 1B.

The first field of observation and the second field of observation have a common part in which both of the imaging modalities can be used.

The first modality can be implemented on the basis of two-dimensional location (that is to say, parallel to the detection surface) of each single interaction. The second modality preferably requires three-dimensional location of each multiple interaction.

The gamma camera comprises a temporal coincidence unit 16, configured to assign an instant of detection t to each interaction detected. The temporal coincidence unit can be used to identify single interactions (only one interaction assigned to one instant) and multiple interactions (a plurality of interactions assigned to the same instant).

The gamma camera 1 comprises a memory 17 configured for storing the single interactions detected at each instant t. The parameters (x,y,E) are assigned to each single interaction:

the coordinates (x,y) are coordinates of the pixels, real or virtual, that have detected the interaction, determined by the location unit 14;

the energy E is the energy released by the interaction, determined by the spectrometry unit 15.

The memory is also configured to store the multiple interactions detected at each instant t. The parameters $$(x_1, y_1, z_1, x_2, y_2, z_2, E_1', E_2')$$

are assigned to each multiple interaction.

The coordinates $(x_1, y_1, z_1, x_2, y_2, z_2)$ correspond to the coordinates of the two scattering interactions, forming the multiple interaction, and detected in temporal coincidence; the energies $$E_1' \text{ and } E_2'$$

detected on each scattering interaction forming the multiple interaction, the total energy of which is $$E' = E_1' + E_2'.$$

The gamma camera may comprise an image forming unit 18 configured to form a gamma image G based on the single interactions. The gamma image G is defined by the coordinates (x,y), parallel to the detection surface 12, each coordinate (x,y) corresponding to a pixel 12. Each point G(x,y) on the gamma image G corresponds to a quantity of single interactions detected by each pixel 12 with the coordinates (x,y).

When the spectrometry circuit 15 is used, the memory 17 can store the energies associated with each interaction detected during an acquisition period. The duration of the acquisition period may vary from several seconds, in the case of strong irradiation, to several minutes or possibly several hours if the irradiation to which the detector material 11 is subjected is weak. In the case of a multiple interaction, the energy of the interaction is the aforementioned total energy, corresponding to the sum of the energies of each scattering interaction.

On the basis of the energies detected, an isotope selection unit 19 is configured to select one or more isotopes that may be present in the observed field. An isotope is denoted below by i. The isotopes are selected according to the probabilities of energy emission by known isotopes, which have been stored in advance. The decay schemes of isotopes capable of forming the irradiating sources in the field of observation are then taken into account. A decay scheme of an isotope is taken to mean the emission energy or energies, as well as the branching ratios (the probabilities of emission of a photon for different emission energies). The isotopes may be selected automatically by the isotope selection unit 19, or manually, in which case the selection is performed by an operator.

The different energies detected may be presented in the form of a global detection spectrum. The global detection spectrum is a histogram of the energies of the different interactions detected, regardless of whether these are single or multiple interactions. Usually, the axis of abscissas corresponds to the energies (or to the channel numbers) and the axis of ordinates corresponds to the numbers of interactions (single or multiple) detected for each energy. The spectrum comprises peaks, each peak corresponding to an emission energy of an isotope. On the basis of the peaks, the isotopes i that may be present in the field of observation are selected. The detection spectrum is plotted on the basis of all the interactions, whether single or multiple. The field of observation $\Omega$ is the second field of observation $\Omega 2$ (i.e. that of the second modality), extending beyond the first field of observation $\Omega 1$ (that of the first modality), to which the first field of observation $\Omega 1$ is added.

In one option, the isotopes located in the field of observation are known. In this case, the user selects the isotopes i to be considered in the isotope selection unit.

The gamma camera comprises a reconstruction unit 20, for positioning any irradiating sources in the field of observation $\Omega$.

Figures 6, 7:
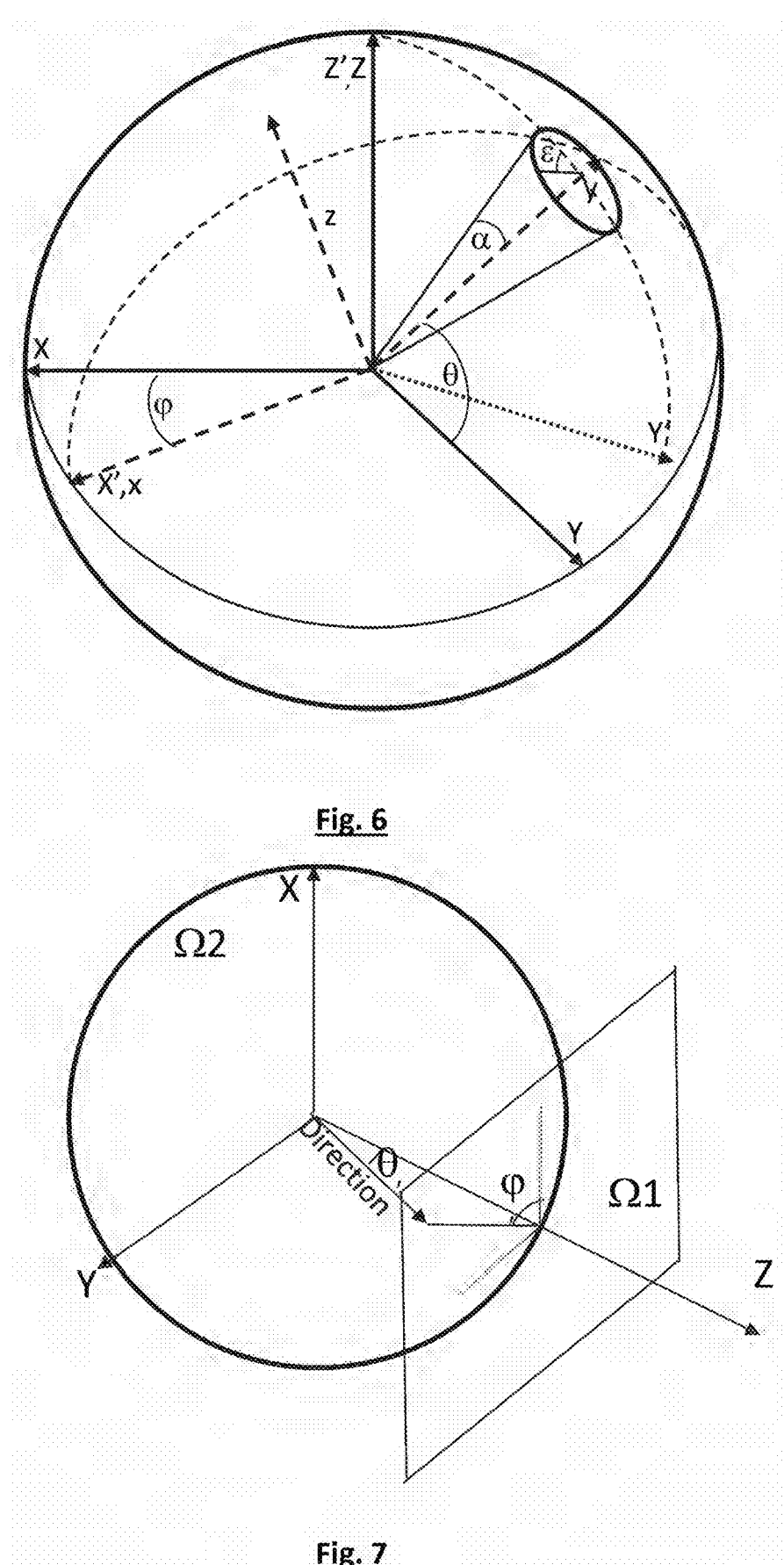
FIG. 6 shows an estimation of a conical surface comprising the path of a photon before scattering.
FIG. 7 illustrates the first field of observation and the second field of observation.

The reconstruction is carried out by a probabilistic method. A distinctive feature of the method used is that a weight is assigned to each interaction detected. The weight corresponds to a probability of emission of the photon detected by an isotope selected by the isotope selection unit 19 at different points in the field of observation. When the first modality is used, only the first field of observation $\Omega 1$ is considered, this field being discretized by points with coordinates X and Y. The field of observation $\Omega 1$ is a plane parallel to the detector, located at a distance d from the latter. The distance d can be chosen arbitrarily. When the second modality is used, the field of observation $\Omega 2$ is considered. As mentioned above, the second field of observation $\Omega 2$ is, for example, a sphere centered on the center of the detector material, with a radius d, where d is the distance between the first field of observation $\Omega 1$ and the detector. FIG. 7 shows the fields of observation $\Omega 1$ and $\Omega 2$. The choice between the first and second modalities is made according to whether an interaction is considered to be single or multiple by the temporal coincidence unit.

Figures 3A, 3B:
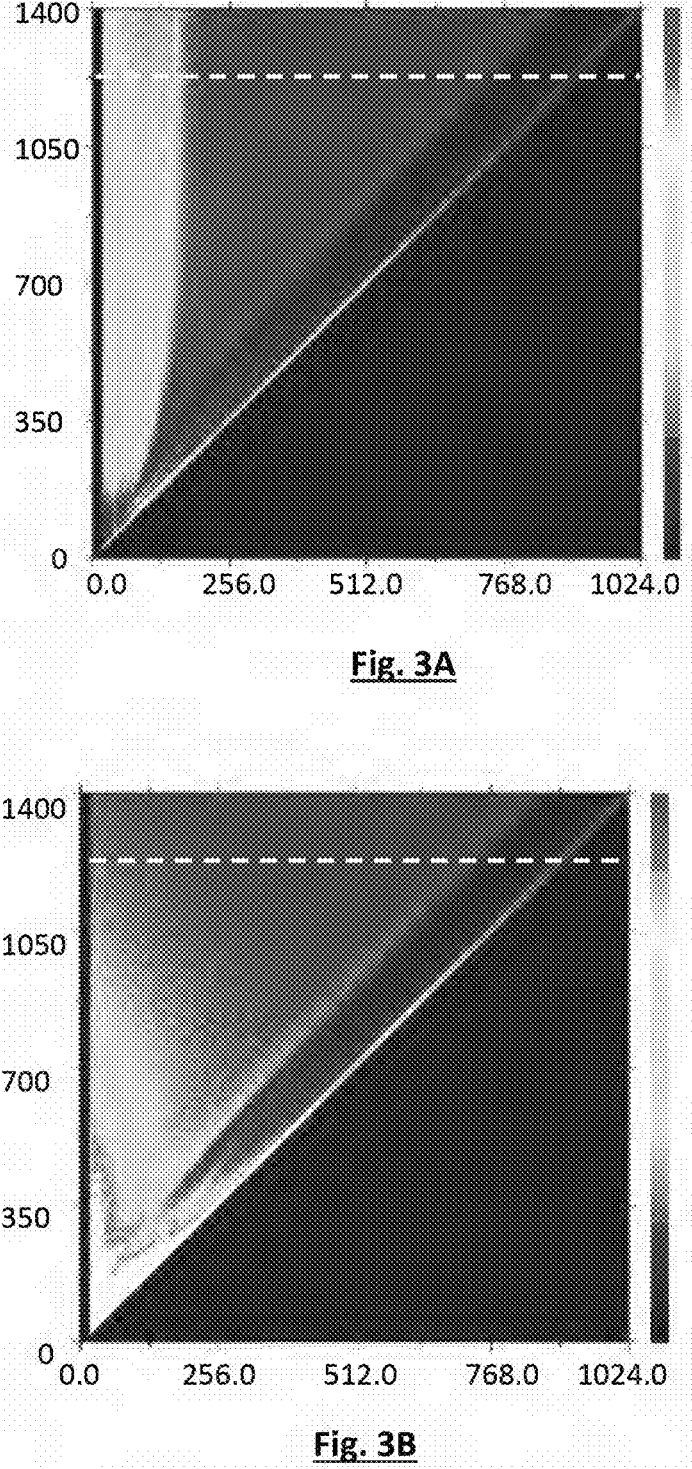
FIG. 3A is a matrix illustrating a spectral response of the gamma particle in the case of a single interaction in the detector material, where the photon that has interacted has conserved the emission energy.
FIG. 3B is a matrix illustrating a spectral response of the gamma particle in the case of a single interaction in the detector material, where the photon that has interacted has not conserved the emission energy or has passed through an absorbent part of the collimator.

FIG. 3A shows, for different emission energies (the axis of ordinates shows units of keV), distributions of the probability of detection of a single interaction in the detector material at different energies (the axis of abscissas shows the channels), on the assumption that the photon that generated the interaction is a direct photon. In FIG. 3A, the axis of abscissas corresponds to a channel with an energy of c, the rank of which is between 1 and 1024, and each channel corresponds to an energy band (or "energy bin"). An energy E' corresponds to each channel. The notation E' denotes the energy associated with each channel, while the notation E denotes the energy incident on the detector. The axis of ordinates corresponds to emission energies. Each emission energy corresponds to a distribution of probabilities of detection in the different energy channels. FIG. 3A is a matrix $H_{s,j}$ of different distributions of probabilities corresponding to different emission energies. The distribution of probabilities corresponding to an emission energy is a row of the matrix, such as that shown in broken lines, corresponding to an energy of 1300 keV. The grey level represents the associated probability level. Thus, each point $H_{s,j}(E',E)$ of the matrix $H_{s,j}$ corresponds to a probability of detection, in an energy channel c, of a photon emitted at an emission energy of E. Thus the matrix $H_{s,j}$ shown in FIG. 3A corresponds to a spectral response matrix of the gamma camera. The spectral response matrix is found on the basis of two assumptions:

the detected interaction is a single interaction, corresponding to the index j. j is a variable taking the value 1 in a single interaction and 2 in a multiple interaction.

the detected photon is a direct photon, that is to say a photon reaching the detector material by propagating through an opening in the collimator 10, and having an energy E corresponding to the emission energy of the isotope. This corresponds to the index s=+. s is a variable taking the value + in the case of a direct photon and − in the case of an indirect photon. An indirect photon is a photon that has interacted before reaching the detector material, or that has passed through the collimator 10 without interacting and reaches the detector material with its initial energy.

In view of these assumptions, each point of the matrix $H_{s,j}$ is such that:

$$H_{s,j}(E', E) = p(E', E, s = +, j = 1),$$

where p(E',E,s=+,j=1) is a probability of detection of the photon in the energy channel c.

FIG. 3B shows a spectral response matrix $H_{s,j}$ plotted for the case of a single interaction (j=1) and an indirect photon: s=−. Each point of the matrix of FIG. 3B is such that $H_{s,j}(E',E)=p(E'|E,s=−,j=1)$. An indirect photon is a photon that has lost some of its energy before being detected, and/or has reached the detector without losing energy by passing through an absorbent part of the collimator 10. The energy loss may be due to scattering in the collimator 10 or in the environment of the gamma camera. The matrices shown in FIGS. 3A and 3B can be obtained by Monte Carlo modeling.

Each spectral response matrix can be obtained by modeling. For this purpose, the main components of the device, namely the frame, the collimator, and the detector material, are modeled. The presence of irradiating sources in the field of observation of the camera is simulated, and, for each photon emitted by a source, the status of the photon reaching the detector (direct or indirect photon) and the energy of the photon detected in the detector are estimated. The irradiating sources are positioned randomly in the field of observation.

Each spectral response matrix is obtained by averaging the energies detected for the direct and indirect photons, respectively.

Figures 3C, 3D:
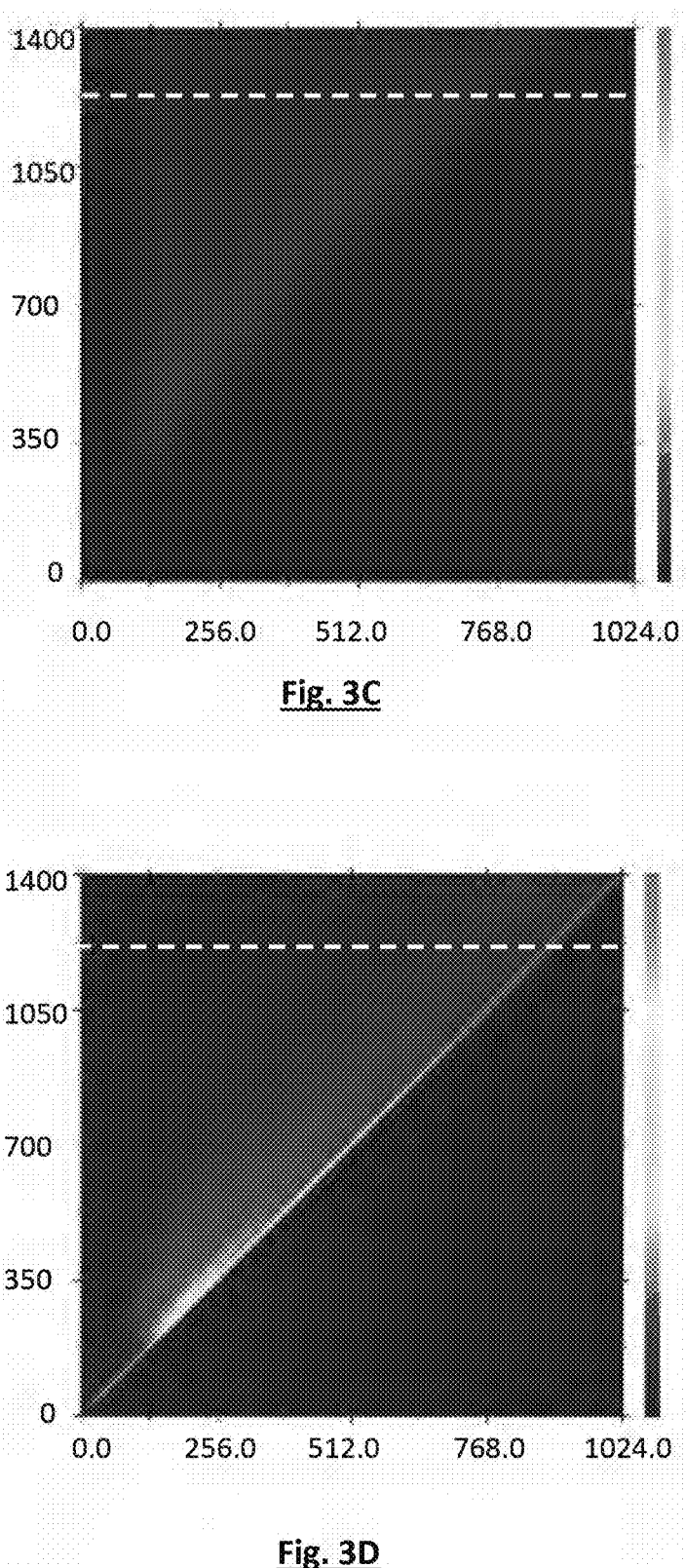
FIG. 3C is a matrix illustrating a spectral response of the gamma particle in the case of a multiple interaction in the detector material, where the photon that has scattered in the detector material has conserved the emission energy.
FIG. 3D is a matrix illustrating a spectral response of the gamma particle in the case of a multiple interaction in the detector material, where the photon that has scattered in the detector material has not conserved the emission energy or has passed through an absorbent part of the collimator.

FIGS. 3C and 3D show, respectively:

a spectral response matrix $H_{s,j}$, as described in relation to FIGS. 3a and 3B, assuming that s=+(direct photon) and j=2 (multiple interaction);

a spectral response matrix $H_{s,j}$, as described in relation to FIGS. 3a and 3B, assuming that s=− (direct photon) and j=2 (multiple interaction); In the case of a multiple interaction, an indirect photon is as defined above, with the addition that the photon does not release all of its energy in the detection material: after scattering, the scattered photon escapes from the material without being absorbed.

By way of a reminder, for each multiple interaction the energy E' corresponds to the sum of the energies detected simultaneously.

According to one option, each spectral response matrix can be established for each pixel. In the example described, a spectral response matrix defined for all the pixels, for each type of interaction, is considered: j=1 or 2 and s=+ or −.

The spectral response matrix can be simulated by the Monte Carlo method.

Figure 4:
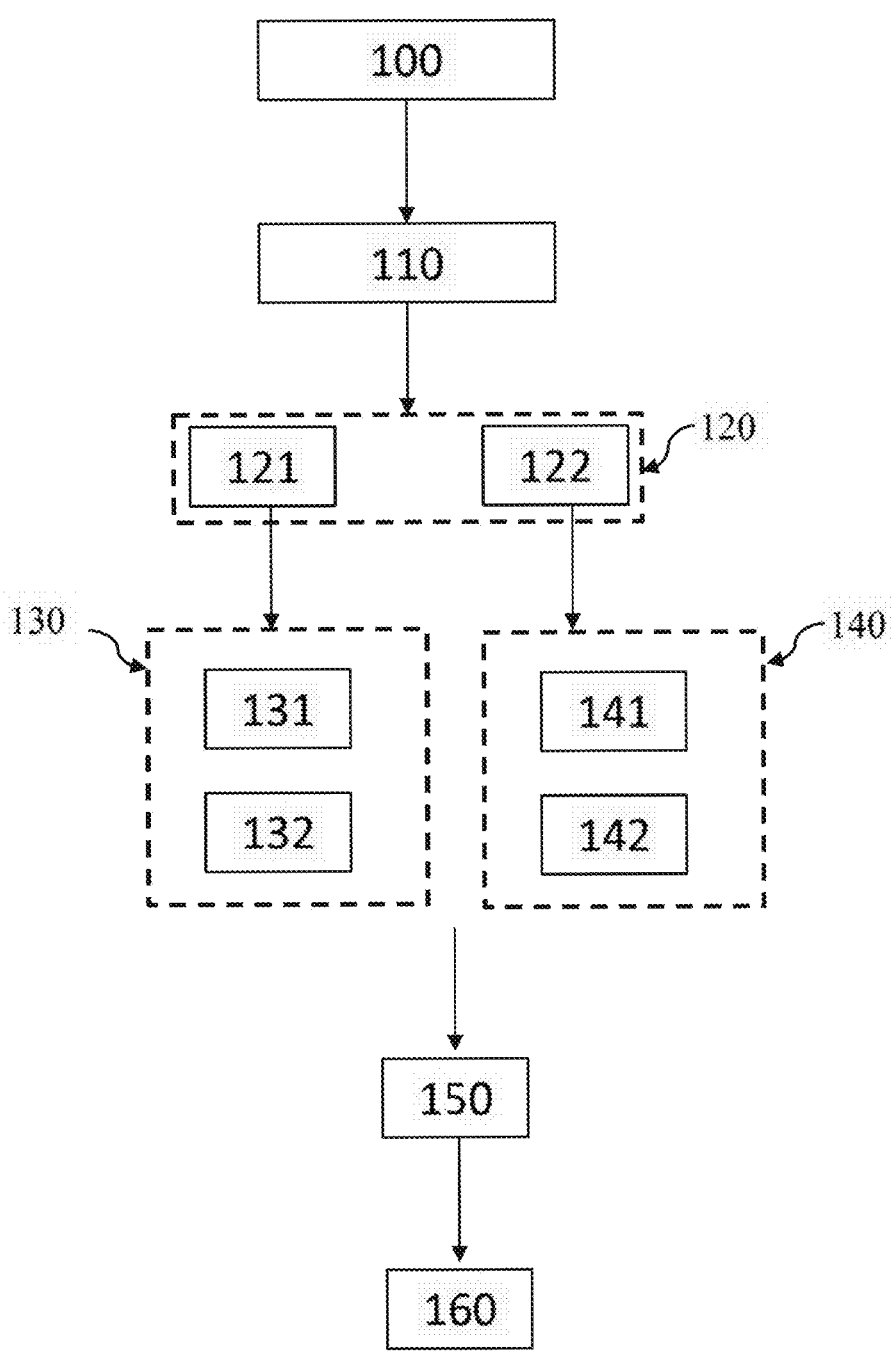
FIG. 4 shows schematically the main steps of a method according to the invention.

FIG. 4 shows the main steps implemented by the different components of the gamma camera for the purpose of obtaining a reconstruction of sources in the field of observation $\Omega$.

Step 100: detecting interactions. The gamma camera is placed in an environment that potentially contains irradiating sources 5. During an acquisition period:

the location unit 14 assigns a position to each interaction detected;

the temporal coincidence unit 16 determines whether each interaction is a single or multiple interaction;

the spectrometry unit 15 assigns an energy E' to each interaction detected. In a multiple interaction, the energy E' corresponds to the sum of at least two energies $$E'_1, E'_2$$

detected simultaneously;

Each interaction can be associated with a rank k, in a chronological manner for example. A set of parameters is assigned to each interaction $$k{:}x_k, y_k, E'_k$$

for a single interaction and $$x_{1,k}, y_{1,k}, z_{1,k}, x_{2,k}, y_{2,k}, z_{2,k}, E'_{1,k}, E'_{2,k}$$

for a multiple interaction.

The parameters of each interaction are stored. The number of interactions stored may be greater than several hundreds or thousands, and may exceed several hundreds of thousands or millions.

Step 110: Selecting an isotope.

In this step, one or more isotopes i are selected, according to the energies $E_k$ detected in the acquisition period. The isotope, or each isotope, can be selected automatically or manually. Alternatively, each isotope is selected on the basis of a priori information about the isotopic composition of the irradiating sources.

Step 120: Taking spatial and spectral response models into account.

The reconstruction unit 20 reconstructs the position of the sources in the observed field on the basis of the single and multiple iterations detected. The reconstruction is carried out by successively taking into account each isotope i selected. Thus step 120 is executed for each isotope i.

The reconstruction of the sources assumes that a spectral response model and a spatial response model have been taken into account. The spectral model D(E',i,s) can be used to define, for each event and case, a probability of energy detected E', for one type of photon (direct or indirect), when the isotope i is known.

Thus, $$D_j(E', i, s) = p(E', s \mid i) \tag{2}$$

$$D_j(E', i, s) = \sum_E H_{s,j}(E', E) p(E \mid i)$$

p(E|i) corresponds to a probability of emission of the energy E by the isotope i. This probability can be determined by means of existing databases, comprising, for each isotope, the emission energies and the corresponding branching ratios.

In the case of a multiple interaction $$(j = 2),\ E' = E'_1 + E'_2.$$

The spatial model corresponds to the probability of detecting an interaction of a photon at a coordinate (x,y) or (x,y,z) when the photon has been emitted at a coordinate (X,Y) of the field of observation. This corresponds to a direct model that can easily be obtained by modeling. For single and multiple interactions, a previously established spatial model is taken into account, corresponding to the first and the second modality respectively.

Thus the reconstruction makes use of a different spectral response model and spatial response model, depending on whether the interaction is single or multiple.

Substep 121: single interactions

For single interactions, the spectral response model is constructed on the basis of the matrices $H_{s,j}$ where j=1. The spatial response model is such that:

for direct photons, use is made of a spatial model taking into account the topography of the coded mask. More precisely, for each source position $(X_1,Y_1)$ in the first field of observation $\Omega 1$, a probability of interaction can be estimated, positioned according to the two-dimensional coordinates (x,y) in the detector material. Thus, $p(x,y|X_1,Y_1,s=+)=M(x,y,X_1,Y_1)$ (3), where $M(x,y,X_1,Y_1)$ is a probability of interaction according to the coordinates (x,y) for an irradiating source located at $(X_1,Y_1)$ in the first field of observation $\Omega 1$. $M(x,y,X_1,Y_1)$ can be determined by numerical modeling.

for indirect photons, a uniform probability of position in the first field of observation is used. $p(x,y|X_1,Y_1,s=-)$ $=\Pi(x,y)\otimes\Pi(X_1,Y_1)$, where $\Pi$ denotes a uniform two-dimensional distribution.

On the basis of the spectral response model D and the spatial response model M, a system response R can be found, such that R=D⊗M. ⊗ is the tensor product operator.

As mentioned above, the interaction depth z is not necessarily used to process single interactions.

Substep 122: multiple interactions

For multiple interactions, the spectral response model is constructed on the basis of the matrices $H_{s,j}$ where j=2. The spatial response model is such that:

For direct photons, a spatial model as mentioned in relation to FIGS. 2A and 2B is used. Each multiple interaction corresponds to two cones C in which the semi-angle at the vertex corresponds to the scattering angle $\alpha$.

$$p(x_1, y_1, z_1, x_2, y_2, z_2, E'_1, E'_2 \mid E, X_2, Y_2, Z_2, s = +)$$

denotes a probability that Compton scattering takes place between the positions $x_1,y_1,z_1$ and $x_2,y_2,z_2$, releasing the respective energies $E_1$ and $E_2$, when a direct photon is emitted at an energy of E in one from a point with the coordinates $(X_2,Y_2,Z_2)$ in the field of observation $\Omega 2$. The spatial model C can be constructed by numerical modeling, as described below.

for indirect photons, a uniform probability of position in the second field of observation $\Omega 2$ is used:

$$p(x_1, y_1, z_1, x_2, y_2, z_2, E'_1, E'_2 \mid E, X_2, Y_2,$$
$$Z_2, s = -) = [\![(x_1, y_1, z_1) \otimes]\!](x_2, y_2, z_2) \otimes S(X_2, Y_2, Z_2),$$

where ⊗ denotes the tensor product, $S(X_2,Y_2,Z_2)$ corresponds to the sphere forming the field of observation $\Omega 2$. It may, for example, be a sphere with a radius of unity.

Figure 5A:
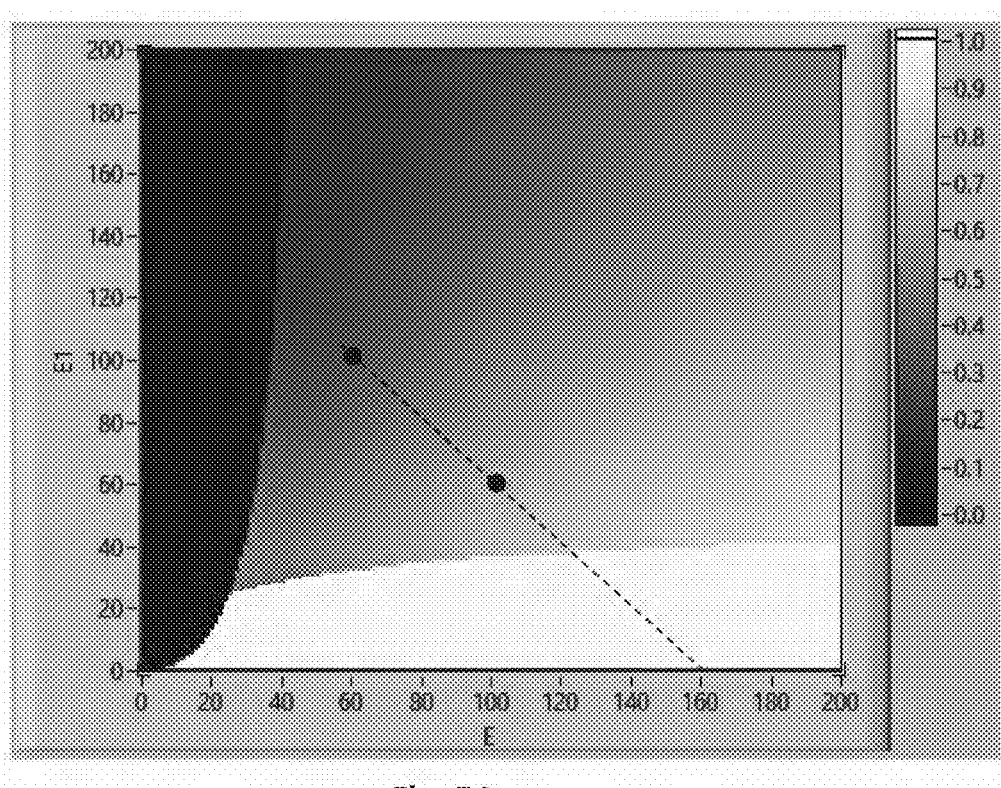
FIG. 5A is a graph for estimating the scattering angle as a function of the energy of two interactions resulting from the scattering.
Figure 5B:
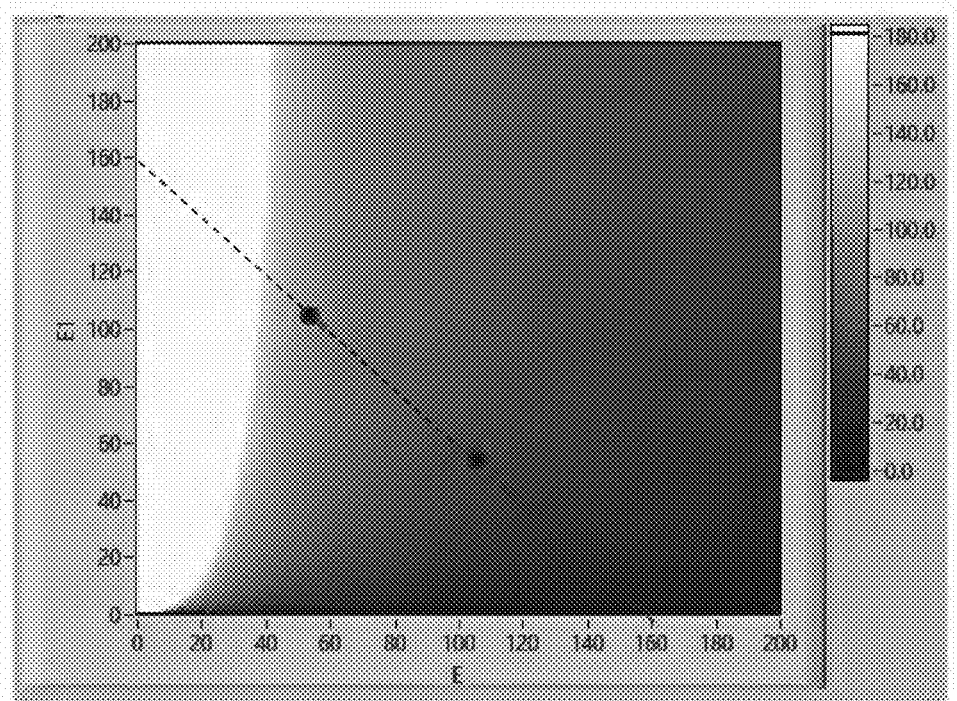
FIG. 5B is a graph for estimating a probability of scattering as a function of the energy of two interactions resulting from the scattering.

FIGS. 5A and 5B illustrate the implementation of the spatial model C used for multiple interactions. FIG. 5A shows the value of the scattering angle $\alpha$ (gray level) as a function of the energies detected from the first interaction (axis of ordinates) and the second interaction (axis of abscissas). On the axes of abscissas and ordinates, the coordinate 100 corresponds to an energy of 511 keV. FIG. 5A shows an example of two detections of interactions with respective energies of 500 keV and 250 keV. The value of the scattering angle $\alpha$, indicated by the gray level, depends on the interaction corresponding to scattering (the first interaction detected in chronological order) and the interaction corresponding to absorption (the second interaction detected in chronological order). If the interaction corresponding to scattering is the interaction with an energy of 500 keV, the value of the scattering angle $\alpha$ is 48°. If the interaction corresponding to scattering is the interaction with an energy of 250 keV, the value of the scattering angle is 97° (backscattering). The broken line corresponds to the sum of energies of the first interaction and the second interaction, in this case 750 keV. The broken line indicates the pairs $$E'_1, E'_2$$

whose total detected energy is equal to 750 keV.

Thus FIG. 5A enables the angle $\alpha$ to be estimated from $$E'_1 \text{ and } E'_2.$$

In the chronological order assigned to the interactions generating the energies $$E_1' \text{ and } E_2',$$

the spatial model corresponds to two cones, extending around the same axis which is a straight line connecting the coordinates $(x_1,y_1,z_2)$ and $(x_2,y_2,z_2)$ of each interaction, of which cones the respective vertices are $(x_1,y_1,z_2)$ and $(x_2, y_2,z_2)$, and the respective semi-angles at the vertices are the two scattering angles obtained by taking into account the two detection chronologies: the interaction located at $(x_1, y_1,z_2)$ occurring, respectively, before or after the interaction located at $(x_2,y_2,z_2)$.

Each cone is assigned a probability, which depends on the chronological order of each detection.

FIG. 5B shows the probabilities associated with each chronological order: 500 keV (scattering), then 250 keV (absorption); or 250 keV (scattering), then 500 keV (absorption). The axes of FIG. 5B are similar to the axes of FIG. 5A. The gray level corresponds to the probability of each chronological order: the probability associated with the configuration (500 keV; 250 keV) is 0.3, while the probability associated with the configuration (250 keV; 500 keV) is several %. The probabilities corresponding to each configuration are determined using the Klein-Nishima formula.

FIGS. 5A and 5B include white areas corresponding to impossible situations.

Using the tabulated data of FIG. 5A and the probabilities of FIG. 5B, and given the positions of each scattering interaction, it is possible to determine two coaxial cones and corresponding semi-angles, determined using FIG. 5A, each cone being assigned a probability determined from FIG. 5B. The axis of each cone is a straight line passing through the positions $(x_1,y_1,z_1)$ and $(x_2,y_2,z_2)$ of each interaction. The uncertainty about the scattering angle, due to the uncertainty about the respective energies $E_1$ and $E_2$ and about the positions of interactions, can be indicated by a thickness defined for each cone. To take the uncertainties into account, the semi-angle of each cone can vary within a confidence range $\alpha\pm\Delta\alpha$, where $\Delta\alpha$ is a measurement uncertainty. The measurement uncertainty is due to the uncertainty as to the estimates of the energies $E_1$ and $E_2$. Each cone is parameterized by the angles $\alpha$ (scattering angle) and $\theta$ (elevation of the cone axis) and $\varphi$ (azimuth of the cone axis), as shown in FIG. 6. FIG. 6 shows schematically the second field of observation $\Omega 2$, similar to a spherical surface in this case. A fixed reference (X, Y and Z) is associated with the second field, the origin of which is at the center of the detector. The X and Y axes are, for example, parallel to the detection surface. The Z axis is perpendicular to the detection surface. FIG. 6 shows a cone with a semi-angle $\alpha$. When the cone passes through the collimator 10, the attenuation due to the latter is taken into account in the model. Thus a probability of the origin of the photon can be established for each angular coordinate $\theta$ and $\varphi$. The position of each source corresponds to an intersection between each cone and the spherical surface.

FIG. 6 also shows:
   a reference frame $(x,y,z)$, linked to the interactions, of which the axis y corresponds to the axis of the cone, that is to say the straight line axis passing through the positions $(x_1,y_1,z_1)$ and $(x_2,y_2,z_2)$;

an intermediate reference frame $(X',Y',Z')$, which is obtained by rotation of the reference frame $(x,y,z)$ about the axis x, which coincides with the axis $X'$, through the angle $\theta$;
   the reference frame $(X,Y,Z)$ linked to the detector, which is obtained by rotation of the intermediate reference frame $(X',Y',Z')$ about the axis $Z'$, which coincides with the axis Z, through the angle $\varphi$.
The coordinates of a point on the cone are:
in the reference frame linked to the interactions $(x,y,z)$ $$\begin{cases} x = \sin(\alpha)\sin(\varepsilon) \\ y = \cos(\alpha) \\ z = \sin(\alpha)\cos(\varepsilon) \end{cases}$$

The angle $\varepsilon$ corresponds to an angle of precession about the axis of the cone, uniformly distributed between 0 and $2\pi$.
   in the intermediate reference frame $(X',Y',Z')$:

$$\begin{cases} X' = x \\ Y' = y\cos(\theta) - z\sin(\theta) \\ Z' = y\sin(\theta) + z\cos(\theta) \end{cases}$$

in the reference frame of the field of observation $\Omega 2$, centered on the detector:

$$\begin{cases} X_2 = X'\cos(\varphi) - Y'\sin(\theta) \\ Y_2 = X'\sin(\varphi) + Y'\cos(\theta) \\ Z_2 = Z' \end{cases}$$

FIG. 7 shows the first field of observation $\Omega 1$, or reduced field of observation, and the second field of observation $\Omega 2$. Some coordinates X,Y,Z defined in the field of observation $\Omega 2$ can be transposed into the first field of observation $\Omega 1$. For this purpose, the angular coordinates $\theta'$ and $\varphi'$ are defined for each coordinate X,Y,Z in the field of observation. When the angular coordinates $\theta'$ and $\varphi'$ intersect the first field of observation $\Omega 1$, the corresponding coordinates in the first field of observation 1 are determined. Thus, for each angular coordinate $\theta'$ and $\varphi'$ included in the reduced field of observation, trigonometric relations can be applied to find a position $X_1,Y_1$ in the reduced field of observation.

$$X_1 = \tan(\theta')\cos(\varphi')$$
$$Y_1 = \tan(\theta')\sin(\varphi')$$

This enables an emission position to be assigned in the first field of observation $\Omega 1$, for a photon that has generated a multiple interaction.
Step 130: reconstructing the single interactions The sources are reconstructed by using an MLEM (Maximum Likelihood Expectation Maximization) reconstruction method, resulting from the application of the Bayes theorem, the single interactions being separated from the multiple interactions. According to the Bayes theorem.

$$p(X_1, Y_1, i \mid E', x, y) = \frac{p(E', x, y \mid X_1, Y_1, i)}{p(E', x, y)} \times p(X_1, Y_1, i) \qquad (4)$$

where:

$p(X_1,Y_1,i)$ Is the current assumption concerning the position and the composition (isotopes) of the sources: this is based on the a priori knowledge of the reconstruction that is available concerning the position of the sources: $p(X_1,Y_1,i)$ corresponds to the current image. In the following text, $p(X_1,Y_1,i)$ is denoted $O(X_1,Y_1,i)$.

$p(E',x,y|X_1,Y_1,i)$ is a direct model, resulting from the global response model R described above, which combines the spectral response and the spatial response.

$p(E',x,y)$ is found by marginalization:

$$p(E', x, y) = \sum_{X_1, Y_1, i, s} (p(E', x, y \mid X_1, Y_1, i) \times p(X_1, Y_1, i)) \quad (5)$$

$p(E',x,y)$ corresponds to what is expected at the detector, taking into account the current image $O(X_1,Y_1,i)$.

The reconstruction process is carried out iteratively, separately for each isotope, in the following substeps:

Substep 131: selecting an isotope from among the isotopes indicated in step 110.

Substep 132: reconstructing an image $O^{(n)}(X_1,Y_1,i)$, corresponding to a spatial distribution of emission intensity of the isotope i in the first field of observation, using single interactions with:

$$O^{(n)}(X_1, Y_1, i) = \sum_k p(X_1, Y_1, i \mid E'_k, x_k, y_k) \quad (6)$$

where k denotes each interaction. According to this embodiment, in what is known as the list mode, the interactions, whether single or multiple, are processed one after another.

Using (4) and (5), we find:

$$O^{(n)}(X_1, Y_1, i) = p(X_1, Y_1, i) \sum_k \frac{p(E'_k, x_k, y_k \mid X_1, Y_1, i)}{p(E'_k, x_k, y_k)} \quad (7)$$

where $$p(E'_k, x_k, y_k \mid X_1, Y_1, i) = \sum_s p(E'_k \mid s, i) p(x_k, y_k \mid X_1, Y_1, s)$$

$$p(E'_k, x_k, y_k \mid X_1, Y_1, i) =$$

$$p(E'_k \mid s+, i) p(x_k, y_k \mid X_1, Y_1, s+) + p(E'_k \mid s-, i) p(x_k, y_k \mid X_1, Y_1, s-)$$

where $p(x_k,y_k|X_1,Y_1,s+)=M(x_k,y_k,X_1,Y_1)$ and $p(x_k,y_k|X_L,s-)=\Pi(x_k,y_k,X_1,Y_1)$ $M(x_k,y_k,X_1,Y_1)$ is the response function of the mask. It is found by using conventional algorithms for reconstructing sources for coded mask gamma cameras.

Substep 132 is implemented iteratively, with:

$$O^{(n+1)}(X_1, Y_1, i) = \quad (8)$$

$$O^{(n)}(X_1, Y_1, i) \sum_k \left[ \frac{p(E'_k, x_k, y_k \mid X_1, Y_1, i)}{\sum_{X_1, Y_1, i} p(E'_k, x_k, y_k \mid X_1, Y_1, i) O^{(n)}(X_1, Y_1, i)} \right]$$

Each iteration, of rank n, is designed to estimate $O^{(n+1)}(X_1,Y_1,i)$ on the basis of a preceding estimate $O^{(n)}(X_1,Y_1,i)$. When n=0, the estimation is carried out on the basis of an initial estimate $O^{(n=0)}(X_1,Y_1,i)$, for example a uniform value at each point and for every isotope i in the field of observation.

In the expressions (7) and (8), the reconstruction is carried out in what is called the list mode, in which the interactions of rank k, stored individually, are taken into account. If $I^{(n)}(x,y,i)$ corresponds to an estimate of the image, formed on the detector, in iteration (n), by the single interactions of the photons emitted by an isotope i, we can write:

$$I^{(n)}(x, y, i, s) = \sum_{X, Y} \left[ p(x, y \mid X_1, Y_1, s) O^{(n)}(X_1, Y_1, i) \right] \quad (9)$$

When s=+, it is considered that the detected photon was directly emitted by the isotope i. The image $I^{(n)}(x,y,i,s)$ is an estimate of the image formed in the camera by the isotope i. When s=−, the detected photon was indirectly emitted by the isotope i. The image $I^{(n)}(x,y,i,s)$ is then uniform.

Expression (8) becomes:

$$O^{(n+1)}(X_1, Y_1, i) = O^{(n)}(X_1, Y_1, i) \sum_{k,s} \left[ \frac{p(E_k \mid i, s) p(x_k, y_k \mid X_1, Y_1, s)}{\sum_{i,s} p(E_k, s \mid i) I^{(n)}(x_k, y_k, i, s)} \right] \quad (10)$$

The first iteration takes into account an a priori initialized reconstruction, denoted $O^{(n=0)}(X,Y,i)$, which is for example a uniform distribution for each isotope.

In expression (10), $p(x_k,y_k|X_1,Y_1,s)$ corresponds to taking into account the spatial response of the camera, that is to say the probability that a photon emitted in $(X_1,Y_1)$ according to the scenario s (direct or indirect photon) is detected in (x,y) in the interaction k.

Expression (10) can be written:

$$O^{(n+1)}(X_1, Y_1, i) = O^{(n)}(X_1, Y_1, i) \sum_k U_k(X_1, Y_1, i) \quad (11)$$

where $$U_k(X_1, Y_1, i) = \sum_s \left[ \frac{p(E_k \mid i, s) p(x_k, y_k \mid X_1, Y_1, s)}{\sum_{i,s} p(E_k, s \mid i) I^{(n)}(x_k, y_k, i, s)} \right] \quad (12)$$

$U_k(X_1,Y_1,i)$ is a contribution of a detection of a single interaction k to the updating of the image $O^{(n+1)}(X_1,Y_1,i)$.

Step 140: The case of multiple interactions

The algorithm followed for multiple interactions is similar to that designed for single interactions. It enables an image to be formed in the field of observation Ω2 defined above.

Substep 141: An isotope is selected in a similar manner to step 131.

Substep 142: The image reconstruction process is carried out in a similar manner to single interactions.

$$p(X_2, Y_2, Z_2, i \mid x_{1,k}, y_{1,k}, z_{1,k}, x_{2,k}, y_{2,k}, z_{2,k}, E'_{1,k}, E'_{2,k}) = \quad (4')$$

$$\frac{p(x_{1,k}, y_{1,k}, z_{1,k}, x_{2,k}, y_{2,k}, z_{2,k}, E'_{1,k}, E'_{2,k} \mid X_2, Y_2, Z_2, i)}{p(x_{1,k}, y_{1,k}, z_{1,k}, x_{2,k}, y_{2,k}, z_{2,k}, E'_{1,k}, E'_{2,k})} p(X_2, Y_2, Z_2, i)$$

$X_2,Y_2,Z_2$ belong to the field of observation Ω2.

The process is designed to reconstruct an image $O'^{(n)}(X_2, Y_2, Z_2, i)$, in the field $\Omega 2$, that corresponds to a spatial distribution of emission intensity of the isotope i in the second field of observation, the latter covering the first field of observation and extending beyond it.

$$O'^{(n)}(X_2, Y_2, Z_2, i) \qquad (6')$$

$$\sum_k p(X_2, Y_2, Z_2, i \mid x_{1,k}, y_{1,k}, z_{1,k}, x_{2,k}, y_{2,k}, z_{2,k}, E'_{1,k}, E'_{2,k})$$

$$O'^{(n)}(X_2, Y_2, Z_2, i) = \qquad (7')$$

$$p(X_2, Y_2, Z_2, i) \sum_k \frac{p(x_{1k}, y_{1k}, z_{1k}, x_{2k}, y_{2k}, z_{2k}, E'_{1k}, E'_{2k} \mid X_2, Y_2, Z_2, i)}{p(x_{1k}, y_{1k}, z_{1k}, x_{2k}, y_{2k}, z_{2k}, E'_{1k}, E'_{2k})}$$

and $$p(x_{1k}, y_{1k}, z_{1k}, x_{2k}, y_{2k}, z_{2k}, E'_{1k}, E'_{2k}) =$$

$$\sum_s p(E'_{1k} + E'_{2k} \mid s, i) p(x_{1k}, y_{1k}, z_{1k}, x_{2k}, y_{2k}, z_{2k} E'_{1k}, E'_{2k} \mid X_2, Y_2, Z_2, s) =$$

$$p(E'_{1k} + E'_{2k} \mid s+, i) p\big(x_{1,k}, y_{1,k}, z_{1,k}, x_{2,k}, y_{2,k}, z_{2,k}, E'_{1,k}, E'_{2,k}, \mid X_2, Y_2,$$

$$Z_2, s+\big) + p\big(x_{1,k}, y_{1,k}, z_{1,k}, x_{2,k}, y_{2,k}, z_{2,k}, E'_{1,k}, E'_{2,k} \mid X_2, Y_2, Z_2, s-\big)$$

where $$p\big(x_{1,k}, y_{1,k}, z_{1,k}, x_{2,k}, y_{2,k}, z_{2,k}, E'_{1,k}, E'_{2,k} \mid X_2, Y_2, Z_2, s+\big) =$$

$$C(\alpha_k, \theta_k, \varphi_k, X_2, Y_2, Z_2) \text{ and } p\big(x_{1,k}, y_{1,k}, z_{1,k}, x_{2,k}, y_{2,k}, z_{2,k},$$

$$E'_{1,k}, E'_{2,k} \mid X_2, Y_2, Z_2, s-\big) = \llbracket (x_1, y_1, z_1, x_2, y_2, z_2, X_2, Y_2, Z_2)$$

$C(\alpha_k, \theta_k, \varphi_k, X_2, Y_2, Z_2)$ corresponds to each cone representing the propagation of the incident radiation, from coordinates $X_2, Y_2, Z_2$ in the field of observation, in the course of a multiple interaction k. It will be recalled that each multiple interaction generates two different cones, weighted by probabilities as described in relation to step 122.

The object image is reconstructed iteratively, where:

$$O'^{(n+1)}(X_2, Y_2, Z_2, i) = O'^{(n)}(X_2, Y_2, Z_2, i) = \qquad (8')$$

$$\sum_k \left[ \frac{p\big(x_{1,k}, y_{1,k}, z_{1,k}, x_{2,k}, y_{2,k}, z_{2,k}, E'_{1,k}, E'_{2,k} \mid X_2, Y_2, Z_2, i\big)}{\sum x_2, y_2, z_2 ip\big(x_{1,k}, y_{1,k}, z_{1,k}, x_{2,k}, y_{2,k}, z_{2,k}, E'_{1,k}, E'_{2,k} \mid}{X_2, Y_2, Z_2, i) O^{(n)}(X_2, Y_2, Z_2, i)} \right]$$

Each iteration, of rank n, is designed to estimate $O'^{(n+1)}(X_2, Y_2, Z_2, i)$ on the basis of a preceding estimate $O'^{(n)}(X_2, Y_2, Z_2, i)$. When n=0, the estimation is carried out on the basis of an initial estimate $O'^{(n=0)}(X_2, Y_2, Z_2, i)$, for example a uniform or null value at each point and for every isotope i in the field of observation.

The first iteration takes into account an a priori initialized reconstruction, denoted $O'^{(n=0)}(X_2, Y_2, Z_2, i)$, which is for example a uniform distribution for each isotope.

Expression (13) can be written:

$$O'^{(n+1)}(X_2, Y_2, Z_2, i) = O'^{(n)}(X_2, Y_2, Z_2, i) = \sum_k U'_k(X_2, Y_2, Z_2, i) \qquad (11')$$

where

-continued $$U'_k(X_2, Y_2, Z_2, i) = \qquad (12')$$

$$\sum_k \left[ \frac{p\big(x_{1,k}, y_{1,k}, z_{1,k}, x_{2,k}, y_{2,k}, z_{2,k}, E'_{1,k}, E'_{2,k} \mid X_2, Y_2, Z_2, i\big)}{\sum x_2, y_2, z_2 ip\big(x_{1,k}, y_{1,k}, z_{1,k}, x_{2,k}, y_{2,k}, z_{2,k}, E'_{1,k}, E'_{2,k} \mid}{X_2, Y_2, Z_2, i) O^{(n)} p(X_2, Y_2, Z_2, i)} \right]$$

$U'_k(X_2, Y_2, Z_2, i)$ is a contribution of a detection of a multiple interaction k to the updating of the image $O'^{(n+1)}(X_2, Y_2, Z_2, i)$.

Step 150: combined reconstruction

Step 140 can be implemented in the part of the field of observation $\Omega$ outside the field of observation $\Omega 1$. Step 130 can be implemented by considering only the single interactions, in the field of observation $\Omega 1$. The invention benefits from the fact that part of the field of observation $\Omega$ is addressed by both imaging modalities, in the area of overlap between $\Omega 1$ and $\Omega 2$. In this example, it is considered that the field in question is the first field of observation $\Omega 1$, on which part of the second field of observation $\Omega 2$ can be projected. Thus some emission points with the coordinates $X_2, Y_2, Z_2$ can be projected into the field of observation $\Omega 1$, their coordinates, in $\Omega 2$, being linked by the equations $$X_1 = \tan(\theta') \cos(\varphi') \qquad (13a)$$

$$Y_1 = \tan(\theta') \sin(\varphi') \qquad (13b)$$

and $$\varphi' = a\tan\left(\frac{Y_1}{X_1}\right) = a\tan\left(\frac{Y_2}{X_2}\right) \qquad (13c)$$

$$\theta' = a\tan\left(\sqrt{X_1^2 + Y_1^2}\right) = a\sin\left(\sqrt{X_2^2 + Y_2^2}\right) \qquad (13d)$$

Alternatively, the first field of observation can be projected into the second field of observation, with:

$$X_2 = \sin\theta' \cos\varphi' \qquad (13e)$$

$$Y_2 = \sin\theta' \sin\varphi' \qquad (13f)$$

$$Z_2 = \cos\varphi' \qquad (13g)$$

Thus, in the first field of observation $\Omega 1$:

$$O^{(n+1)}(X_1, Y_1, i) = O^{(n)}(X_1, Y_1, i) \sum_k [U_k(X_1, Y_1, i) + U'_k(X_{2\rightarrow 1}, Y_{2\rightarrow 1}, i)] \qquad (14)$$

where $X_{2\rightarrow 1}, Y_{2\rightarrow 1}$ are the coordinates, initially determined in the second field of observation $\Omega 2$, that can be projected into $\Omega 1$ by applying the expressions for changing the reference frame, shown in (13a) to (13g).

Outside the area of overlap, the reconstruction can be carried out according to (11'), on the basis of multiple interactions only. This allows reconstruction in the part of the field of observation $\Omega 2$ that does not overlap with $\Omega 1$.

The reconstruction can also be obtained by projecting the first field of observation onto the second field of observation: In this case, the variables are changed according to expressions (13d) to (13g). This allows reconstruction in the first field of observation projected onto part of the second field of observation, in the area in which the two fields of observation overlap.

For each isotope considered, the iterations stop when a convergence criterion is reached. This may be, for example, the mean square deviation between two successive reconstructed images.

When the all of the isotopes have been included in a reconstruction, the reconstruction process is stopped (step 160).

Figures 8A, 8B:
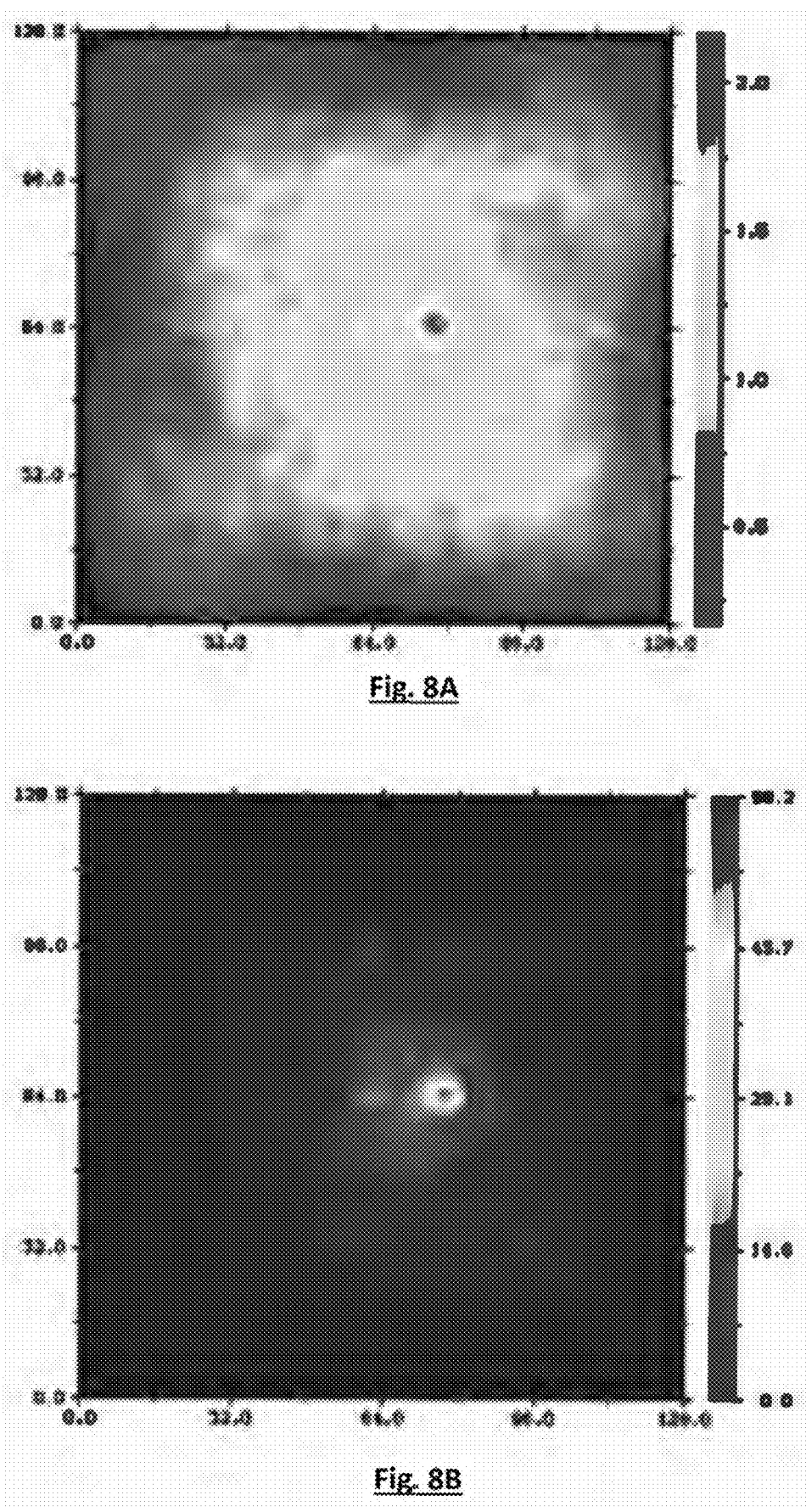
FIGS. 8A, 8C and 8E are examples of positions of sources reconstructed on the basis of a first imaging modality (coded mask imaging), a second reconstruction modality (Compton imaging), and a combination of the first and second modalities: in each of these figures, the image reconstruction has been carried out with a single iteration.
FIGS. 8B, 8D and 8F are examples of positions of sources reconstructed on the basis of a first imaging modality (coded mask imaging), a second reconstruction modality (Compton imaging), and a combination of the first and second modalities: in each of these figures, the image reconstruction has been carried out in a plurality of iterations.
Figures 8C, 8D:
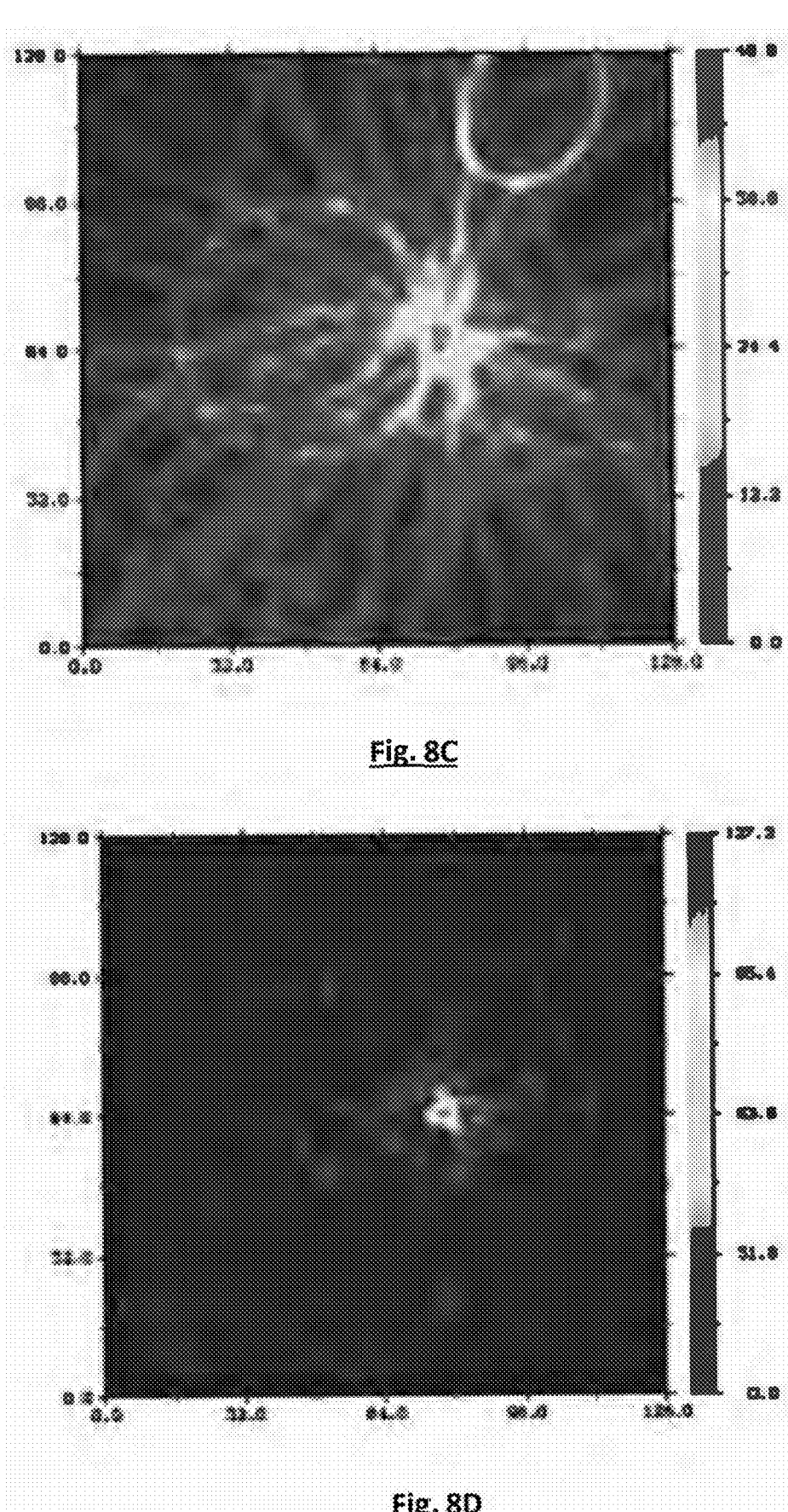
Figure 8E:
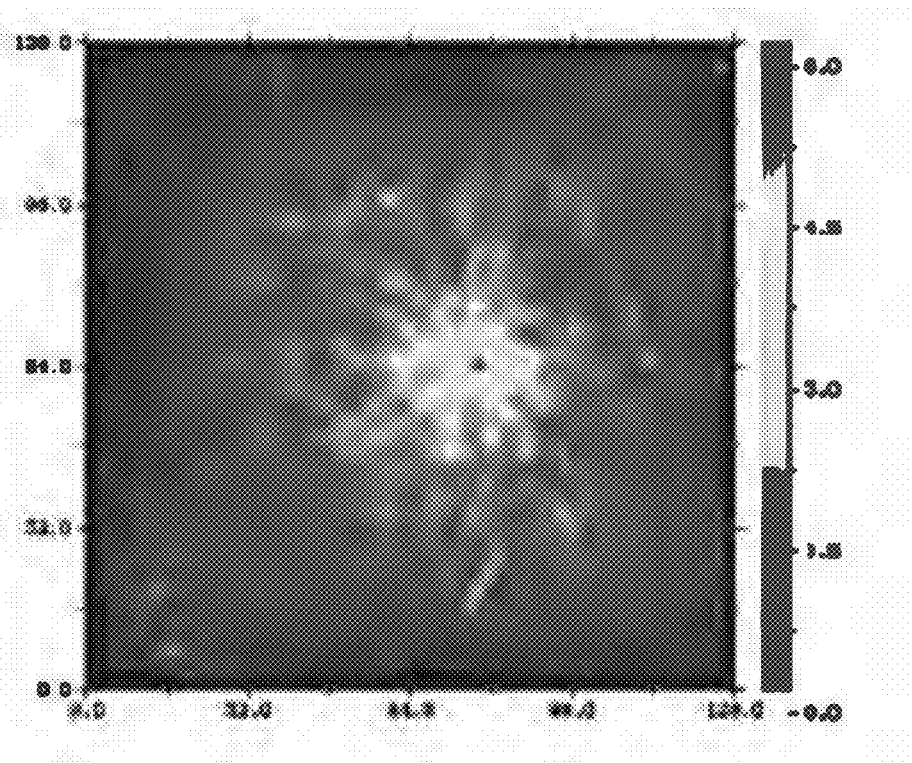

The inventors have implemented the invention by exposing the gamma camera to a $^{137}$Cs source with an activity of 5 MBq, placed 1 m from a gamma camera such as that described above. The source was placed in the reduced field of observation $\Omega 1$: it was therefore visible in both the first modality (coded mask) and the second modality (Compton imaging). FIGS. 8A, 8C and 8E show an image of the source obtained on the basis of a single iteration of the reconstruction algorithm in the following ways, respectively:

by considering only the single interactions: the image of the source is obtained according to the first modality, on the basis of 584 interactions detected (FIG. 8A);

by considering only the multiple interactions: the image of the source is obtained according to the second modality, on the basis of 104 multiple interactions detected (FIG. 8C);

by considering both the single and the multiple interactions: the image of the source is obtained by combining the first and second modalities (FIG. 8E).

FIG. 8E results in a more precise detection of the source, compared with FIG. 8C and FIG. 8A.

Figure 8F:
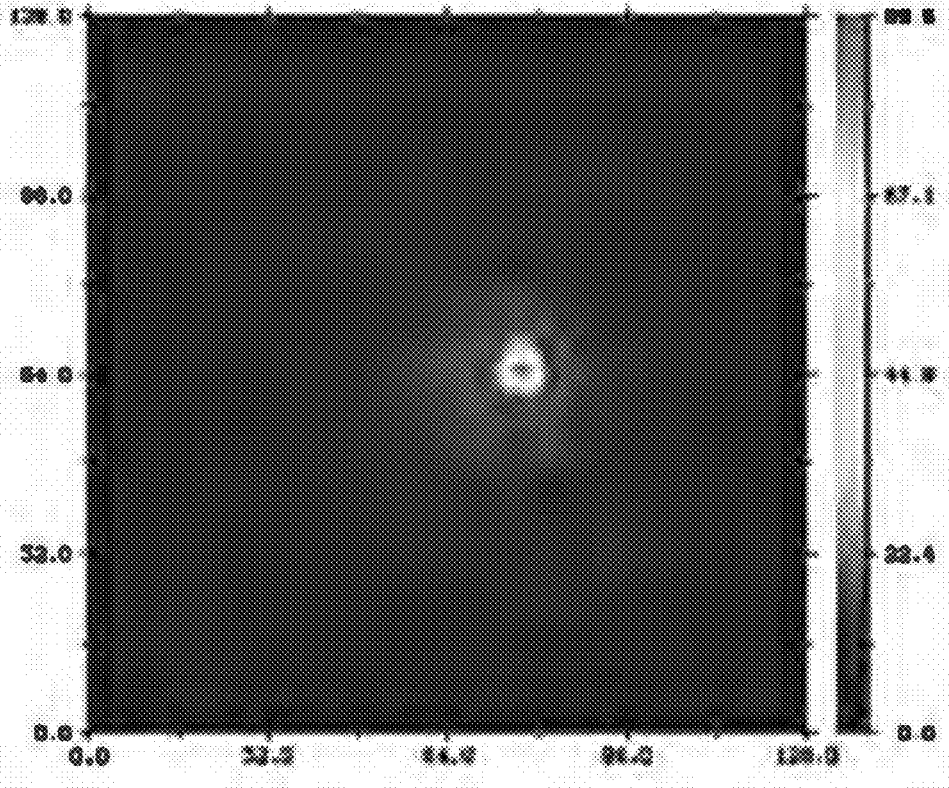
Figure 9A:
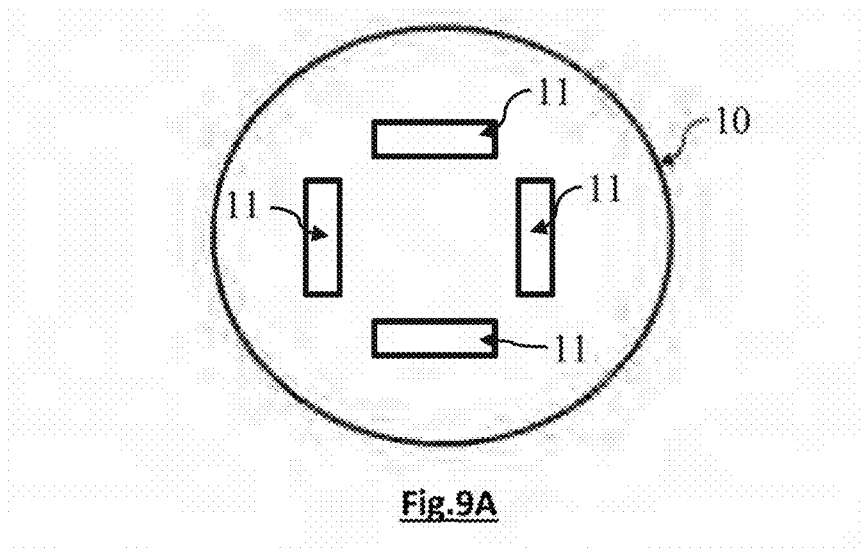
FIGS. 9A and 9B illustrate a variant of a gamma camera for the implementation of the invention.
Figure 9B:
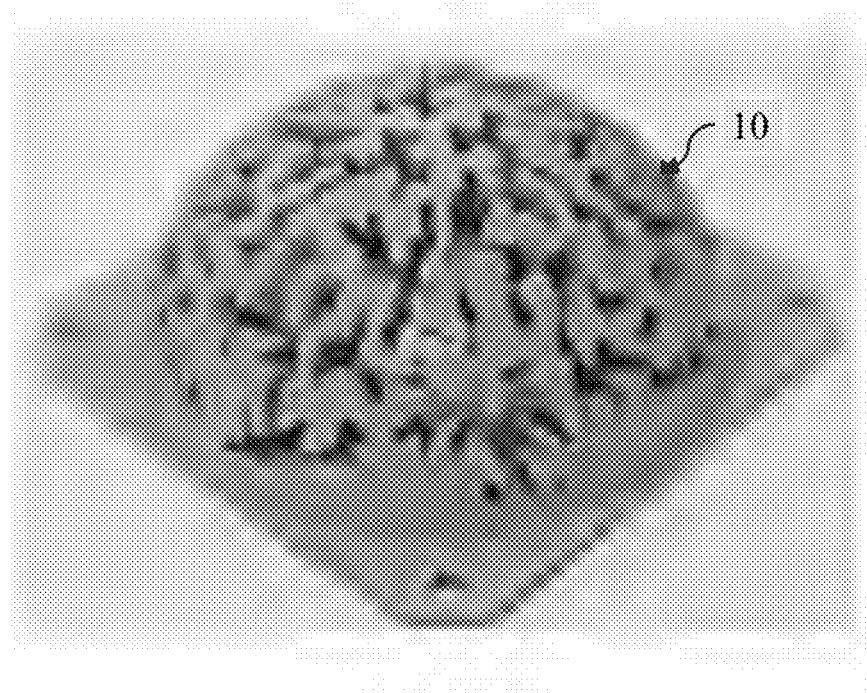

FIGS. 8B, 8D and 8F show an image of the source obtained by several tens of iterations of the algorithm described above, in the following ways, respectively:

by considering only the single interactions: the image of the source is obtained according to the first modality, on the basis of 584 interactions detected;

by considering only the multiple interactions: the image of the source is obtained according to the second modality, on the basis of 104 multiple interactions detected;

by considering both the single and the multiple interactions: the image of the source is obtained by combining the first and second modalities. According to one option, the camera comprises a plurality of detection materials, distributed on different planes, each detection material 11 being located facing a spherical coded mask collimator. Such a variant is illustrated in FIGS. 9A and 9B. According to this variant, the first field of observation $\Omega 1$ has different components, distributed facing each detection material 11. FIG. 9B illustrates a hemispherical coded mask 10. The spherical coded mask is formed by assembling two hemispherical coded masks. The second field of observation $\Omega 2$ comprises all the first fields of observation $\Omega 1$ and extends between these fields over a spherical surface.

The invention claimed is:

1. A method of estimating positions of irradiating sources in a field of observation, using a gamma camera, the gamma camera comprising:

a detection material;

pixels distributed over a detection surface of the detection material, each pixel being configured to form a detection signal associated with the detection of an interaction of an ionizing photon in the detection material;

a collimator, facing the detection material, and defining a first field of observation, included in the field of observation of the gamma camera;

a location unit, configured to assign a position to each interaction in the detection material, using the detection signal generated by said interaction;

a spectrometry unit, configured to assign an energy to each interaction detected, on the basis of the detection signal associated with said interaction;

a coincidence unit, configured to identify each interaction as a single or multiple interaction, a multiple interaction being formed from two scattering interactions detected in temporal coincidence;

a memory, configured to store detected interaction parameters;

the method comprising:

a) acquiring detection signals by the pixels within an acquisition period, each detection signal being associated with a detected interaction;

b) on the basis of the detection signals, assigning a position and an energy to each interaction detected;

c) identifying each detected interaction as a single or multiple interaction;

d) using the memory to store the parameters of each interaction, whether single or multiple, the parameters of each interaction comprising the position and energy of said interaction;

wherein the method further comprises:

e) selecting an isotope from a list of isotopes;

f) according to the energy assigned to each interaction, whether single or multiple, calculating a probability of emission by the isotope;

g) on the basis of the parameters of each interaction, whether single or multiple, calculating a probability of emission of the photon that has generated the interaction, from different points in the field of observation;

h) calculating an a priori probability of emission of a photon for the selected isotope, from the different points of the field of observation;

i) according to the probabilities resulting from g) and h), calculating a spatial distribution of emission intensity in the first field of observation for the isotope selected in step e).

2. The method of claim 1, wherein steps h) and i) are executed iteratively, so that on each iteration:

step h) comprises defining a spatial distribution of the emission intensity of the isotope, whether initial or resulting from a preceding iteration;

step i) comprises updating the spatial distribution of the emission intensity for the selected isotope, according to:

the a priori probability of emission resulting from step h) of the same iteration;

the probabilities resulting from steps f) and g).

3. The method of claim 1, wherein, in step e), the isotope is:

selected according to the energies respectively assigned to different interactions detected;

or selected arbitrarily.

4. The method of claim 1, wherein steps f) to i) are executed successively for different isotopes selected.

5. The method of claim 1, wherein step f) is executed by calculating:

a probability that the photon that has generated the interaction is a direct photon that was emitted by the isotope according to an emission energy of the isotope, and that has reached the detection material while conserving the emission energy, without passing through an absorbent part of the collimator;

a probability that the photon that has generated the interaction is an indirect photon that was emitted by the isotope according to an emission energy of the isotope, and that has reached the detection material with an energy less than the emission energy and/or by passing through an absorbent part of the collimator.

6. The method as claimed in claim 5, wherein step f) comprises taking into account, for each emission energy of the isotope:

a distribution of probabilities of detection of an interaction in the detector material at different energies, on the assumption that the photon that has generated the interaction is a direct photon;

a distribution of probabilities of detection of an interaction in the detector material at different energies, on the assumption that the photon that generated the interaction is an indirect photon;

the distributions of probabilities of detection having been previously calculated for the cases of a single interaction and a multiple interaction.

7. The method of claim 1, wherein step g) comprises:

if the interaction is single, selecting a first spatial response model of the camera, the probability of the emission position from different points of the first field of observation being determined according to the first spatial response model and according to the position of the interaction in the detector material;

if the interaction is multiple, selecting a second spatial response model of the camera, the probability of the emission position from different points of the field of observation being determined according to the second spatial response and energy model and according to the position of the interactions detected in temporal coincidence and forming the multiple interaction in the detector material.

8. The method of claim 7, wherein the first spatial response model can determine, for different two-dimensional positions of single interactions established parallel to the detection surface, a probability of detection of a photon emitted from different points of the first field of observation, each single interaction being an interaction not considered to be multiple.

9. The method of claim 7, wherein the second spatial response model determines, for different three-dimensional positions of interactions detected in temporal coincidence forming the multiple interaction, and for different energy values of said interactions, a probability of detection of a photon emitted from different points of the field of observation.

10. A gamma camera, designed to detect a presence of irradiating sources in a field of observation, the gamma camera comprising:

a detection material;

pixels distributed over a detection surface of the detection material, each pixel being configured to form a detection signal associated with an interaction of an ionizing photon in the detection material;

a collimator, positioned to face the detection material, and defining a first field of observation, included in the field of observation of the gamma camera;

a location unit, configured to assign a position to each interaction in the detection material, on the basis of the detection signal generated by said interaction;

a spectrometry unit, configured to assign an energy to each interaction detected, on the basis of the detection signal associate with said interaction;

a coincidence unit, configured to identify each interaction as a single or multiple interaction, a multiple interaction being formed from two scattering interactions detected in temporal coincidence;

a memory, configured to store detected interaction parameters;

a processing unit, configured to process the interactions stored in the memory, the processing unit being configured to implement steps d) to i) of the method according to claim 1.

* * * * *